(12) United States Patent
Shoemaker et al.

(10) Patent No.: US 7,958,144 B2
(45) Date of Patent: Jun. 7, 2011

(54) SYSTEM AND METHOD FOR SECURE RECIPROCAL EXCHANGE OF DATA

(75) Inventors: Daniel D. Shoemaker, San Diego, CA (US); Lee Thomas O'Donnell, Tarzana, CA (US); James P. Broder, San Diego, CA (US); Scott D. Shoemaker, San Diego, CA (US)

(73) Assignee: Boss Logic, LLC, San Diego, CA (US)

( * ) Notice: Subject to any disclaimer, the term of this patent is extended or adjusted under 35 U.S.C. 154(b) by 2326 days.

(21) Appl. No.: 10/651,733

(22) Filed: Aug. 29, 2003

(65) Prior Publication Data
US 2005/0182767 A1  Aug. 18, 2005

Related U.S. Application Data

(60) Provisional application No. 60/407,553, filed on Aug. 30, 2002.

(51) Int. Cl.
*G06F 17/30* (2006.01)
(52) U.S. Cl. ........ 707/781; 707/785; 709/223; 709/225; 709/227; 709/229
(58) Field of Classification Search .............. 707/9, 100, 707/781, 785; 709/223, 225, 227, 229
See application file for complete search history.

(56) References Cited

U.S. PATENT DOCUMENTS

| | | | |
|---|---|---|---|
| 3,798,605 A | 3/1974 | Feistel | |
| 5,235,642 A | 8/1993 | Wobber et al. | |
| 6,023,762 A * | 2/2000 | Dean et al. | 713/193 |
| 6,023,765 A * | 2/2000 | Kuhn | 726/4 |
| 6,112,186 A | 8/2000 | Bergh et al. | |
| 6,272,631 B1 | 8/2001 | Thomlinson et al. | |
| 6,275,824 B1 | 8/2001 | O'Flaherty et al. | |
| 6,345,293 B1 | 2/2002 | Chaddha | |
| 6,360,324 B2 | 3/2002 | Van Blarkom | |
| 6,389,542 B1 | 5/2002 | Flyntz | |
| 6,393,569 B1 | 5/2002 | Orenshteyn | |
| 6,405,319 B1 | 6/2002 | Arnold et al. | |
| 6,412,070 B1 | 6/2002 | Van Dyke et al. | |
| 6,463,417 B1 * | 10/2002 | Schoenberg | 705/2 |
| 6,757,530 B2 * | 6/2004 | Rouse et al. | 455/412.1 |
| 6,757,722 B2 | 6/2004 | Lonnfors et al. | |
| 7,181,017 B1 * | 2/2007 | Nagel et al. | 380/282 |
| 2001/0000537 A1 | 4/2001 | Inala et al. | |

(Continued)

OTHER PUBLICATIONS www.mightyphone.com, home page for MightyPhone, a mobile phone service. A product of fusionOne. Aug. 29, 2003.

(Continued)

*Primary Examiner* — Hanh B Thai
(74) *Attorney, Agent, or Firm* — Roeder & Broder, LLP; James P. Broder

(57) ABSTRACT

A system for transmission of data between a first device operated by a first user and a second device includes a database that receives a first set of data input by the first user and a second set of data input by the second user. In one embodiment, the first set of data includes an immediate mode of access and/or one or more future modes of access of the first user which correlate to one or more specific time periods during which the future mode of access will become the immediate mode of access. Additionally, the first set of data can include a time-dependent schedule of the future mode of access of the first user.

67 Claims, 22 Drawing Sheets

U.S. PATENT DOCUMENTS

| | | | |
|---|---|---|---|
| 2001/0054155 A1 | 12/2001 | Hagan et al. | |
| 2002/0007330 A1 | 1/2002 | Kumar et al. | |
| 2002/0010679 A1* | 1/2002 | Felsher | 705/51 |
| 2002/0013827 A1 | 1/2002 | Edstrom et al. | |
| 2002/0026381 A1 | 2/2002 | Sasaki | |
| 2002/0029252 A1 | 3/2002 | Segan et al. | |
| 2002/0046404 A1* | 4/2002 | Mizutani | 725/58 |
| 2002/0087878 A1 | 7/2002 | Ballen et al. | |
| 2002/0091667 A1* | 7/2002 | Jaipuria et al. | 707/1 |
| 2003/0130856 A1* | 7/2003 | Matsuo | 705/1 |
| 2003/0163705 A1* | 8/2003 | Richards et al. | 713/182 |
| 2005/0182644 A1* | 8/2005 | Douvikas et al. | 705/1 |

OTHER PUBLICATIONS www.goodcontacts.com, home page for GoodContacts, used in managing contact data quality. Aug. 29, 2003.

www.plaxo.com, home page for Plaxo, Inc., an online address book service. Aug. 29, 2003.

www.digitalme.com, home page for digitalme, an online address book service. A product of Novell. Aug. 29, 2003.

www.classmates.com, home page for classmates.com, a high school alumni contact website. Aug. 29, 2003.

www.infotriever.com, home page for infotriever, an online communication service. Aug. 29, 2003.

* cited by examiner

| Company: | Another Co. | — 541 | 543 — | Medium |
| --- | --- | --- | --- | --- |
| Address 1: | 1234 Second Street | | | Medium |
| Address 2: | Suite 100 | | | Medium |
| Address 3: | | | | Medium |
| City: | Anytown | | | Medium |
| State: | CA | | | Medium |
| Zip: | 92345 | | | Medium |
| Country: | USA | | | Medium |
| Phone 1: | 555 - 555 - 2004 Ext 1001 | | | Medium |
| Phone 2: | 555 - 555 - 2005 Ext 1002 | | | Medium |
| Fax: | 555 - 555 - 2006 | | | Medium |

| E-mail 1: | bobsmith@somedomain1.com | | | Low |
| --- | --- | --- | --- | --- |
| E-mail 2: | bobsmith@somedomain2.com | | | Medium |
| Internet URL: | http://www.sugardata.com | — 541 | | Medium |
| Mobile 1: | 555 - 555 - 2007 | | 543 — | Medium |
| Mobile 2: | 555 - 555 - 2008 | | | Medium |
| Pager: | 555 - 555 - 2009 | | | Medium |

Add New Contact — 640

Enter the contact's e-mail address or User #:

Clearance: [High] — 644
— 642

[Submit] [Cancel]

Fig. 6A

New Contact — 646

You have successfully added the following new contact to your Contact List:

1001

Sugardata has sent an e-mail to your new contact.
For your records, a copy has been sent to your e-mail address.

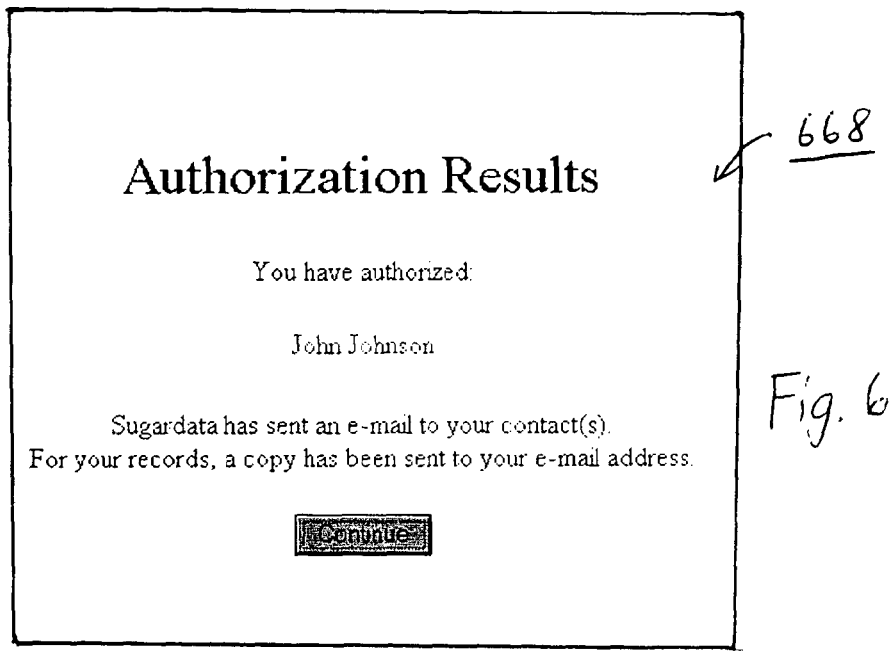

John Johnson

Immediate Mode of Access 555-555-1114

1144

Birthdate: 1/1

← 714B home ...

1234 First Street
Anytown CA 91234
USA
(555) 555-1110
(555) 555-1111 work — 716, 718

Some Co.
1234 Second Street
Anytown CA 92345
(555) 555-1112 x.1001
(555) 555-1113 x.1002 johnjones@somedomain1.com ← 716
johnjones@somedomain2.com ← 718
http://www.somewebaddress.com
(555) 555-1114
(555) 555-1115
(555) 555-1116 (p)

Send Text Message — 720

Return

Fig. 7B

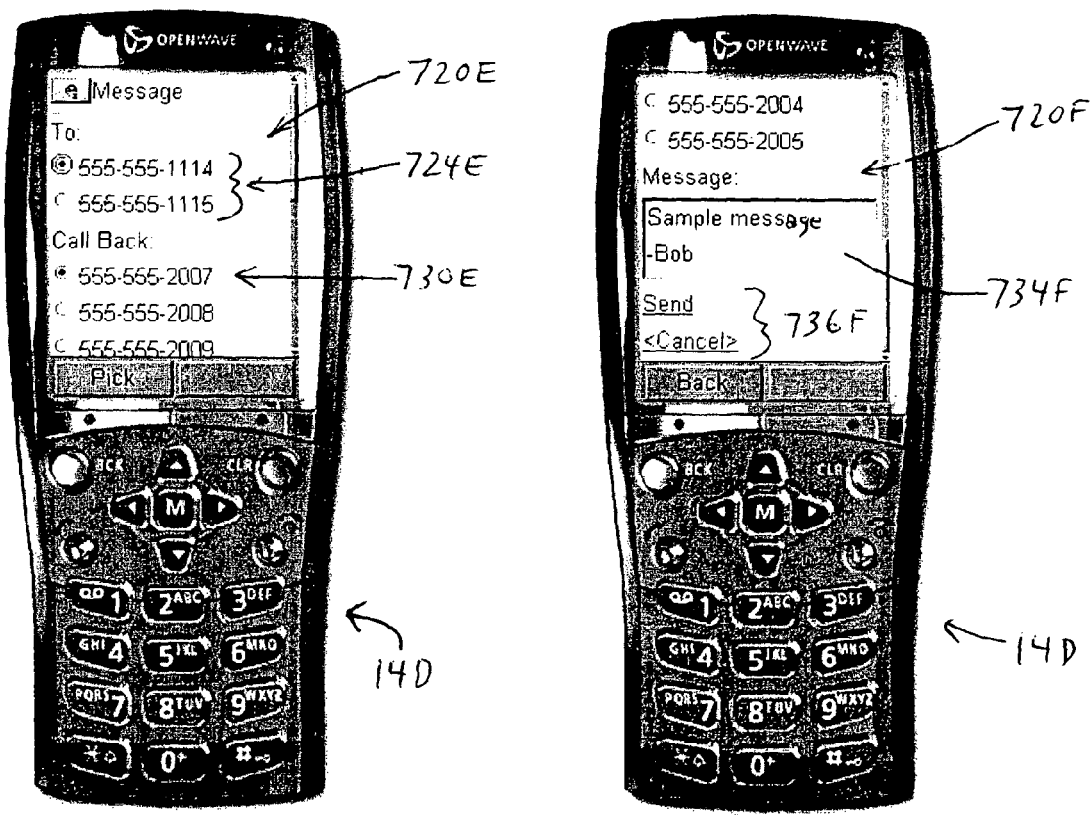

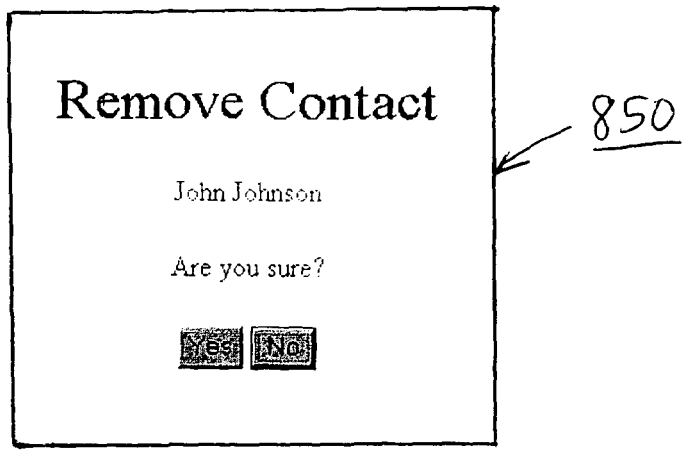
Fig. 8
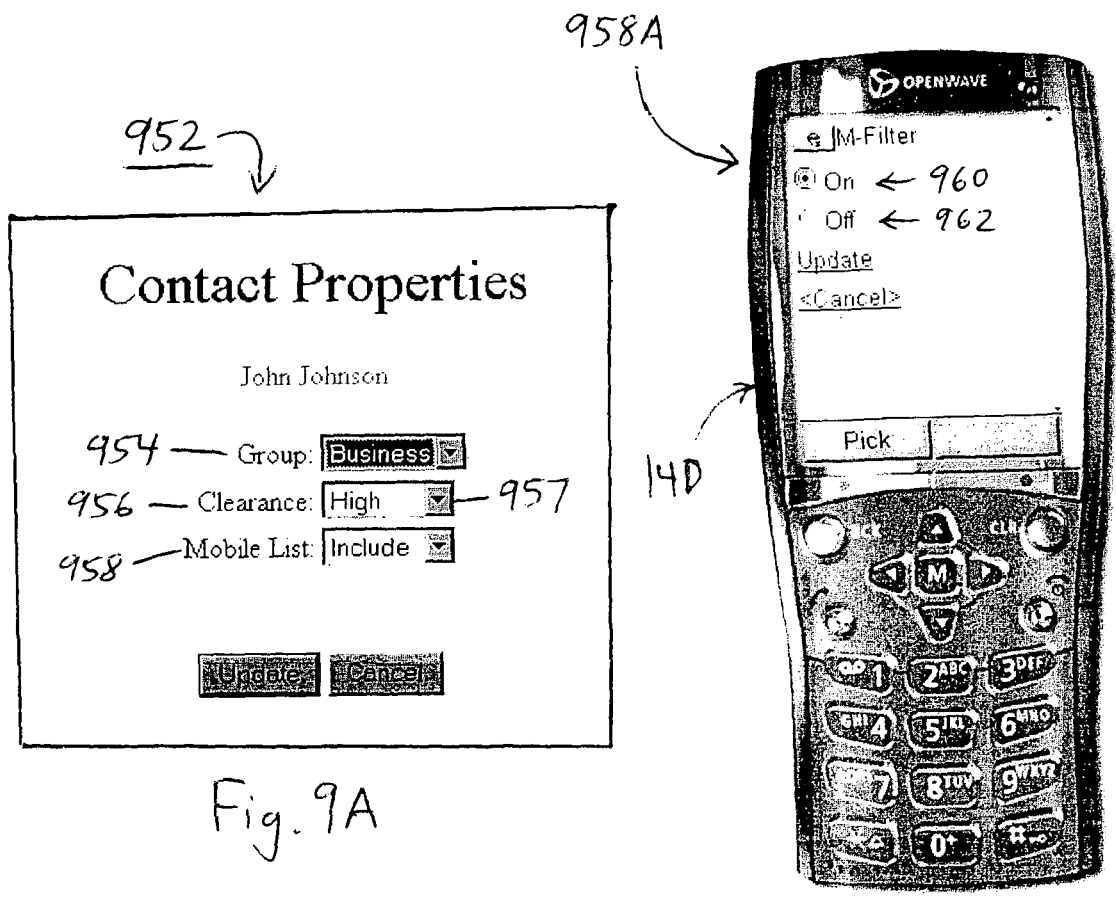
Fig. 9A
Fig. 9B

Mode of Access Schedule

1080 — Schedule: [A ▼]

○ None
○ Home: (858) 792-7566
○ Work: (858) 202-5736
○ Mobile: (858) 336-4460
○ Pager: (866) 359-6813
○ E-mail: shoemake-d@stanfordalumni.org
○ Other: [_____]

Privacy: [Low ▼]

[Update] [Cancel]

1072 →

| | 8am | 9am | 10 am | 11 am | 12pm | 1pm | 2pm | 3pm | 4 pm | 5 pm | 6 pm | 7pm | 8pm | 9 pm – 8am |
|---|---|---|---|---|---|---|---|---|---|---|---|---|---|---|
| | ● | ○ | ○ | ○ | ○ | ○ | ○ | ○ | ○ | ○ | ○ | ○ | ○ | ○ |
| | ○ | ● | ○ | ○ | ○ | ○ | ○ | ○ | ○ | ○ | ○ | ○ | ○ | ○ |
| | ○ | ○ | ● | ○ | ○ | ○ | ○ | ○ | ○ | ○ | ○ | ○ | ○ | ○ |
| | ○ | ○ | ○ | ● | ○ | ○ | ○ | ○ | ○ | ○ | ○ | ○ | ○ | ○ |
| | ○ | ○ | ○ | ○ | ● | ○ | ○ | ○ | ○ | ○ | ○ | ○ | ○ | ○ |
| | ○ | ○ | ○ | ○ | ○ | ● | ○ | ○ | ○ | ○ | ○ | ○ | ○ | ○ |
| | ○ | ○ | ○ | ○ | ○ | ○ | ● | ○ | ○ | ○ | ○ | ○ | ○ | ○ |
| | ○ | ○ | ○ | ○ | ○ | ○ | ○ | ● | ○ | ○ | ○ | ○ | ○ | ○ |
| | ○ | ○ | ○ | ○ | ○ | ○ | ○ | ○ | ● | ○ | ○ | ○ | ○ | ○ |
| | ○ | ○ | ○ | ○ | ○ | ○ | ○ | ○ | ○ | ● | ○ | ○ | ○ | ○ |
| | ○ | ○ | ○ | ○ | ○ | ○ | ○ | ○ | ○ | ○ | ● | ○ | ○ | ○ |
| | ○ | ○ | ○ | ○ | ○ | ○ | ○ | ○ | ○ | ○ | ○ | ● | ○ | ○ |
| | ○ | ○ | ○ | ○ | ○ | ○ | ○ | ○ | ○ | ○ | ○ | ○ | ● | ○ |
| | ○ | ○ | ○ | ○ | ○ | ○ | ○ | ○ | ○ | ○ | ○ | ○ | ○ | ○ |

Fig. 10C

SYSTEM AND METHOD FOR SECURE RECIPROCAL EXCHANGE OF DATA

RELATED APPLICATION

This Application claims the benefit on U.S. Provisional Application Ser. No. 60/407,553 filed on Aug. 30, 2002. The contents of U.S. Provisional Application Ser. No. 60/407,553 are incorporated herein by reference.

FIELD OF THE INVENTION

The present invention is directed toward a computerized system and method that facilitates the exchange of data between a plurality of authorized users of the system.

BACKGROUND

The communications world is becoming more and more technologically advanced each year. The era of each person having only one single telephone number is essentially a thing of the past. With the advent of computer technology, including wireless communications such as mobile phones, personal digital assistants (PDA's), laptop or notebook computers, personal computers (PC's) and other electronic devices, keeping track of family, friends, business associates and colleagues, and other acquaintances has become increasingly difficult. Not only does each person typically maintain several different phone numbers, electronic mail addresses, home and business addresses and other types of important information, but such information changes with a greater frequency than only a decade previously.

Historically, one staple of the common household or office has been a manually maintained address book or Rolodex organizer. However, with today's growing and ever-changing contact information, one can spend a substantial amount of time writing, erasing and further updating this important data. Even those that have become accustomed to maintaining a computerized address book are still routinely required to update and/or confirm the contact information of everyone in their address book in an attempt to keep somewhat current. Also, because it has become a daunting task to keep track of each contact's basic contact information, efficiently keeping dozens, hundreds or even thousands of these contacts apprised of one's own recently-changed contact information has become even more complicated. In other words, these types of manually compiled and maintained computer address books have numerous logistical drawbacks and ultimately do not ensure that the information in them is up-to-date and accurate.

In addition, because there are so many modes (i.e. mobile phone, work phone, home phone, e-mail, text message, etc.) of contacting or accessing even one person, it is nearly impossible to know the specific mode which will yield the highest success rate at a particular time on any given day. Oftentimes, substantial guesswork is required by trying two, three, four or more different such modes before reaching a desired contact. In some cases, none of the modes of access may be successful, such as when the desired contact is staying at the residence of a friend or relative.

Moreover, because of the growing number of different modes of access, a greater likelihood of potentially being contacted by undesirable persons or entities (also commonly known as "spam") exists. Regrettably, current efforts of safeguarding against or blocking spammers have enjoyed just limited success with within certain modes of access. Spamming still runs rampant within other modes of access.

Unfortunately, attempts at creating a computerized address book have not been entirely satisfactory. Such address books typically require manual updating, which can be very time-consuming. Further, these address books often require synchronization between a PC, a PDA, a mobile phone and/or other electronic devices to increase the likelihood that consistent information is maintained. In addition, some electronic address books require the user to download software onto their computer system in order to run the programs. With these types of systems, one must typically be on his or her own device to access such information or other data. Moreover, if the electronic device is ever lost, stolen, broken or destroyed, or if the data on the device becomes lost or unusable e.g. in the case of a hard drive crash, the user may need to completely reprogram the device and re-enter all of the data onto the device, or obtain the data from a backup system, which may also be not entirely up-to-date. Such an unpleasant experience can be extremely frustrating and can require a significant amount of time which most people cannot afford to spend.

In light of the above, a need exists for a manner of keeping track of one's contacts which requires less maintenance by the user. A further need exists for a way to keep business and/or personal contact information up-to-the-minute accurate with a substantially reduced level of time and effort. Still another need exists to provide a system and method that increases the likelihood of successfully accessing another person by the mode desired by that person. Yet another need exists to provide a method of ubiquitously accessing and/or maintaining important data from a greater number of computerized devices.

SUMMARY

The present invention is directed toward a system for transmission of data between a first device operated by a first user and a second device operated by a second user. In one embodiment, the system includes a database that is in network communication with the devices, and which receives a first set of data input by the first user and a second set of data input by the second user. In this embodiment, the second user can access at least a first portion of the first set of data from the database only after the second user authorizes the first user to access at least a first portion of the second set of data from the database. In a further embodiment, the second user can access the first portion of the first set of data from the database only after the first user authorizes the second user to access the first portion of the first set of data from the database.

In one embodiment, the first set of data includes a plurality of modes of access of the first user. One of the modes of access can be selected by the first user as an immediate mode of access, which can be included in the first portion of the first set of data. The first set of data can also include a future mode of access of the first user which can be selected from the modes of access of the first user. In this embodiment, the future mode of access correlates to one or more specific time periods during which the future mode of access will become the immediate mode of access. In some embodiments, the second user cannot access the future mode of access of the first user, but can only access the immediate mode of access of the first user. Additionally, the first set of data can include a time-dependent schedule of the future mode of access of the first user.

In another embodiment, the second device can be a mobile phone having its own memory. In this embodiment, the database can automatically update the memory of the mobile phone with the first portion of the first set of data at a frequency that is input into the database by the second user.

Moreover, the first user can specify a hierarchical privacy level for one or more fields of data within the first set of data, and a correlative hierarchical clearance level to the second user, and/or other users of the system. The clearance level is compared against the first privacy level to determine whether the second user has access to the first portion of the first set of data from the database. With this design, the first user can customize which data input by the first user can be accessed by which other users of the system.

The present invention is also directed to a method transmitting data between a first user and a second user.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 6A is an embodiment of an add contact screen having features of the present invention;

FIG. 6B is an embodiment of a confirmation screen for adding a Contact;

FIG. 6F is an embodiment of an authorization confirmation screen for adding a Contact;

FIG. 6G is an embodiment of a portion of a table illustrating a requirement by a database of the computer system for reciprocity between a plurality of Users of the computer system;

FIG. 7B is an embodiment of a contact view screen having features of the present invention;

FIG. 7E is another embodiment of the text message screen having features of the present invention;

FIG. 7F is another embodiment of the text message screen having features of the present invention;

FIG. 8 is an embodiment of a remove contact screen having features of the present invention;

FIG. 9A is an embodiment of a contact properties screen having features of the present invention;

FIG. 9B is an embodiment of a mobile list screen having features of the present invention;

FIG. 10C is another embodiment of the immediate mode of access schedule screen having features of the present invention;

DESCRIPTION

The present invention provides a computer system (also referred to herein simply as a "system") and method that facilitates the transmittal and/or retrieval of personal and business information or other types of data by and between one or more users (hereinafter "User") of the system. Using a reciprocal authorization method, a hierarchical security system, and/or an easier and more efficient manner of modifying information to be provided to other users, each User can access and provide current data with greater security and accuracy.

Figure 1:
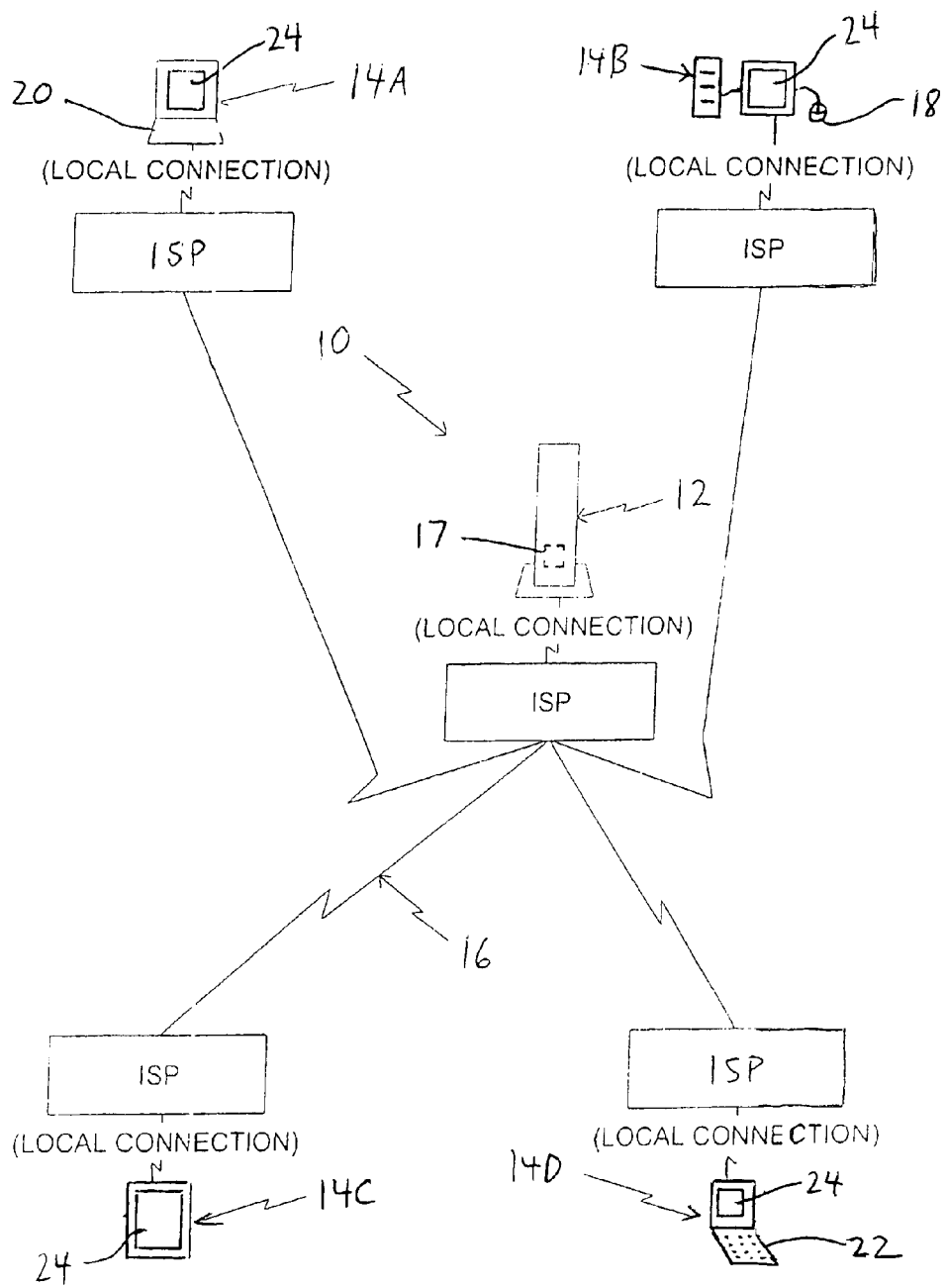
FIG. 1 is a diagram of a computer system having features of the present invention that illustrates the interconnectivity among a plurality of devices and a server using a communications network.

As an overview, FIG. 1 is a simplified block diagram that illustrates a computer system 10 including a server 12 in communication with a plurality of devices 14A-D which are operatively connected together using a communications network 16, such as the Internet. The server 12 includes computer hardware having one or more processors. Further, the server can include software (not shown) that interfaces with and/or connects to the database 17. As used herein, the term "database" can include one or more software applications, which can include one or more web applications, that interface with and/or connect to the database 17 to perform the functions provided herein. As one example, the software can also be used for formatting various screens illustrated herein that display data from the database 17 or provide functionality associated with the database 17. Other examples of the functionality of the software applications are provided herein by referring to the various functions performed by the database 17.

The server 12 illustrated in FIG. 1 can function as part of a non-distributed network which includes a database 17 (illustrated in phantom) that stores data. In an alternative embodiment, the server 12 can be part of a distributed network that utilizes a plurality of components or nodes in one or more separate geographical locations, with each component performing one or more separate functions of the system. In the embodiment illustrated in FIG. 1, the server 12 can manage and/or control functions related to communications among and between the devices 14A-D, as well as data and other information or communication transfers between the database 17 and one or more of the devices 14A-D.

Each of the devices 14A-D can include necessary hardware and software for initiating, controlling and/or displaying images that are generated during usage of the system 10. Each device 14A-D is typically a computer having processing and program execution capability. In the embodiment illustrated in FIG. 1, the first device 14A can be a notebook computer, the second device 14B can be a desktop computer such as a personal computer (PC), the third device 14C can be a wireless device such as a personal digital assistant (PDA), and the fourth device 14D can be another wireless device such as a wireless phone (also sometimes referred to herein as a "mobile phone"). Importantly, the present invention is suitable for use with any wired or wireless device that can access an integrated network such as the Internet. Moreover, identification of the types of devices 14A-D in this embodiment is for ease of discussion only. It is recognized that any of the devices 14A-D can be any type of wired or wireless device suitable for use with the present invention, and such devices are not restricted to those devices listed above.

The communications network 16 can include a number of communication sub-systems or apparatuses. Each device 14A-D is able to electronically communicate with the communications network 16 using an Internet Service Provider (ISP) or an online service provider, such as America Online, AT&T or Earthlink as non-exclusive examples. Access to such service providers is achieved through local telephone, cable, digital subscriber line (DSL) or another suitable communications connection from each device 14A-D. However, the system operates equally as effectively even when the devices 14A-D are electrically decoupled from one another 14A-D and/or the database 17.

A mouse 18, a keyboard 20, a keypad 22, auditory or optical recognition devices (not shown) or another input device can be included in one or more of the devices 14A-D, which enables the User to initiate and/or carry out the User's commands. A computer display screen 24 can provide the User with visual data and/or other information from the database 17 while using the system 10. Additionally, audio information from the database 17 can be queried, stored and/or communicated to the User through the corresponding device 14A-D.

The server 12 can also communicate with the communications network 16 such as the Internet through a local connection and a service provider to the network. The server 12 can store all user data in the database 17, which can be a Structured Query Language (SQL) database, for example. Further, the server 12 can access the communications network 16 to transfer or transmit information and/or data to the devices 14A-D. As provided herein, each User can have a unique user identifier that allows such User to access the database 17 using any or all of the devices 14A-D. Alternatively, each of the devices 14A-D can have an address associated with it that the server 12 uses in connection with communication transfers. Additionally, the server 12 has an address that enables desired communications from the devices 14A-D to reach the server 12 in the context of initiating the transmittal, storage and/or retrieval of data. Moreover, in one embodiment, the data transmitted between the server 12 and the devices 14A-D is encrypted using Secure Sockets Layer (SSL) or another suitably effective data encryption method.

The server 12 can include a plurality of server units forming a server array (not shown) that can function as a multi-processing unit capable of handling requests and/or queries from a substantial number of devices 14A-D, e.g. thousands or millions. With this design, a large number of data transfers can occur simultaneously from a plurality of devices. In one embodiment, no downloading of software is required by the devices 14A-D to access the database 17. Alternatively, each device 14A-D can have identical or substantially similar software which can be obtained by downloading the software from the server 12.

As described herein, each User of the system 10 can compile a list of individuals or entities with whom the User wants to keep in contact and/or exchange information. The list of contacts is also referred to herein as a contact list, which includes certain information or other data regarding the individual or the entity (hereinafter a "Contact"). As used herein, the terms "User" and "Contact" are interchangeable. In other words, in the embodiments provided herein, a Contact can be a User, or vice versa. Moreover, for the sake of simplicity, the description provided herein focuses on a limited number of Users and Contacts. However, it is recognized that the present invention can accommodate any number of Users and/or Contacts.

As provided herein, the present invention automatically provides a User with current personal and/or business information as input by each Contact into the database 17. Stated another way, in one embodiment, the User does not need to manually input any information of the User's Contacts in order to receive immediate, up-to-the-second data regarding each Contact in the User's contact list. The User can also provide his or her own data to a limited number or all of the Contacts without the time requirement of individually providing such information to each separate Contact. In other words, such information can be provided categorically, accurately and efficiently. Moreover, the level or extent of information to be provided to each Contact can be precisely controlled by the User. In one embodiment, the agreement to exchange information between two Users must be reciprocal, or no information is transmitted between the two Users.

As background, the present invention is suitable for use over the Internet by using the World Wide Web. Further, the system 10 can also effectively be used in an Intranet environment. Additionally, the system 10 can be used in a Wide Area Network (WAN) and/or a Local Area Network (LAN) setting. Moreover, the present invention performs equally well in a wired network over which the information is transmitted, or in a wireless environment.

Figure 2:
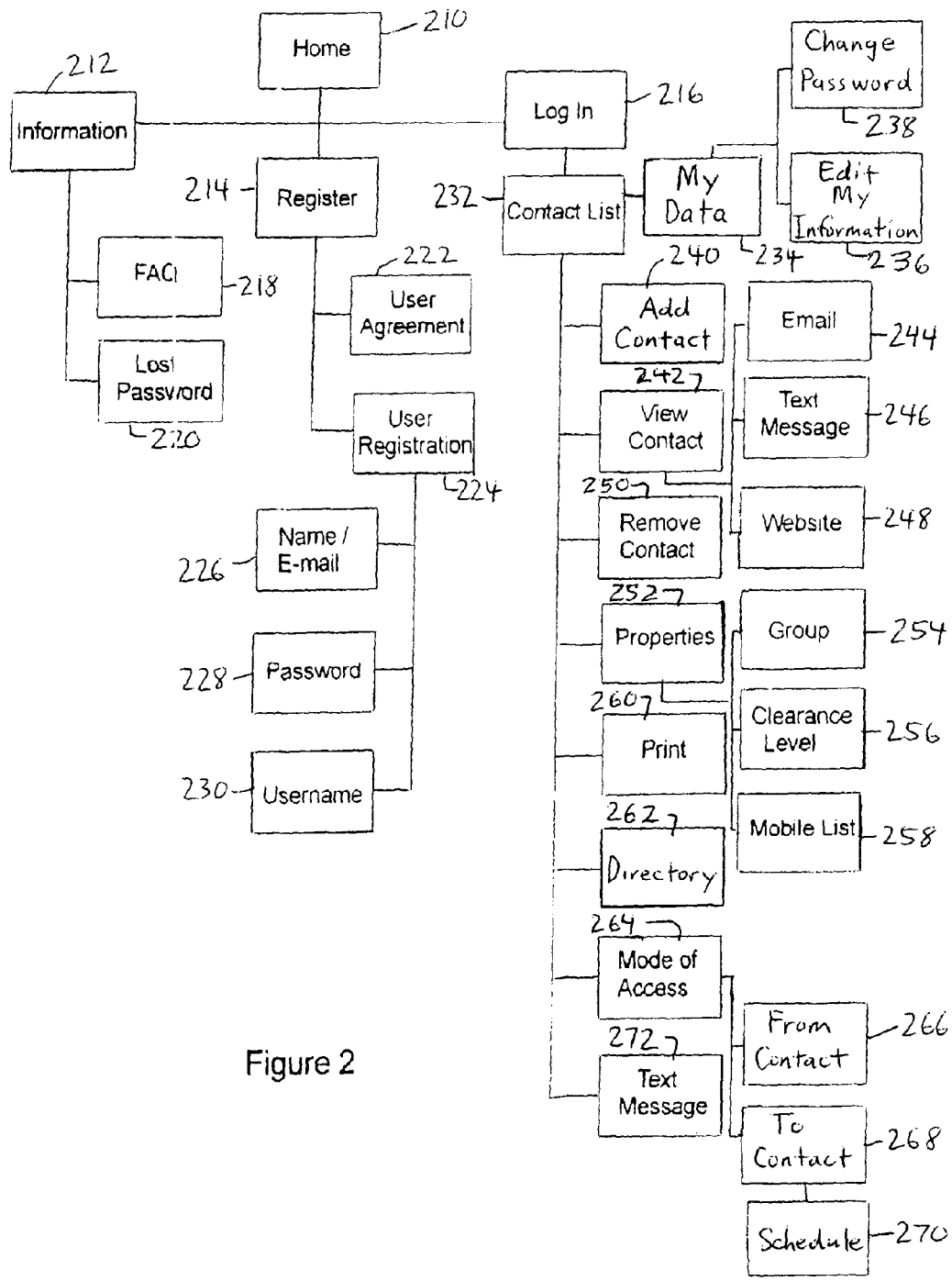
FIG. 2 is a flow diagram illustrating one embodiment the computer system having features of the present invention, including various functions available during usage of the computer system.

FIG. 2 is a simplified flow diagram illustrating one embodiment of some of the features and functions of the present invention. It is recognized that FIG. 2 is merely illustrative and is not intended to be limiting in any manner. In an Internet setting, the User can access a system website (step 210) from any device that has web browser capabilities. For example, such access can occur from the device's web browser (i.e. Internet Explorer, Netscape or Mozilla as non-exclusive examples) or a Wireless Application Protocol (WAP) browser (i.e. Nokia WAP browser or Openwave WAP browser as non-exclusive examples) for wireless devices by inputting the appropriate uniform resource locator (URL) to gain access to a home page of the facilitating website (step 210). Alternatively, an application can be downloaded and/or installed onto a device, which can use the Internet to connect to the database 17. The database 17 can then be queried to populate the application downloaded and/or installed onto the device, without the necessity of a web browser.

In the embodiment illustrated in FIG. 2, the User can then select from various available options. For example, the User can elect to seek information regarding the system (step 212), register with the system (step 214), or log in to the system (step 216) to access additional functions. It is recognized that the options available to the User as illustrated in FIG. 2 are not exclusive of all options that can be exercised by the User, but are representative examples of one or more types of options commonly available to the User. Additionally, not all options illustrated in FIG. 2 are required for the system 10 to be effective.

For example, obtaining information (step 212) can provide the User with information about the system 10, which can be in the form of Frequently Asked Questions (FAQ's) (step 218), services provided to Users of the system, security information such as retrieval of a lost password (step 220), requests for feedback, and other relevant information, and may include hyperlinks to sub pages for providing this information.

The User can opt to register (step 214) with the system 10. Upon selecting the registration option (step 214), the User can be requested to review terms of a user agreement (step 222), and indicate acceptance or rejection of the terms. In the event the User accepts the terms of the agreement, the User can then register with the system (step 224). During the registration process (step 224), the User provides basic information to the system, which can include the User's name and/or electronic mail address (step 226), a password (step 228) and/or a username (step 230), for example. The information input by the User is provided to the database 17 (illustrated in FIG. 1), and a unique user-specific identifier can be provided to the User by the database 17. The user-specific identifier can be a numeric, alphanumeric or alphabetical identifier, or any other suitable unique identifier such as a username chosen by the User or by the database 17. If chosen by the database 17, the identifier can be provided to the User by electronic mail, facsimile, or by another suitable means, provided a requisite level of security can be maintained. Additionally, procedures can be available to the User in the event the User forgets his or her user-specific identifier.

Figure 3:
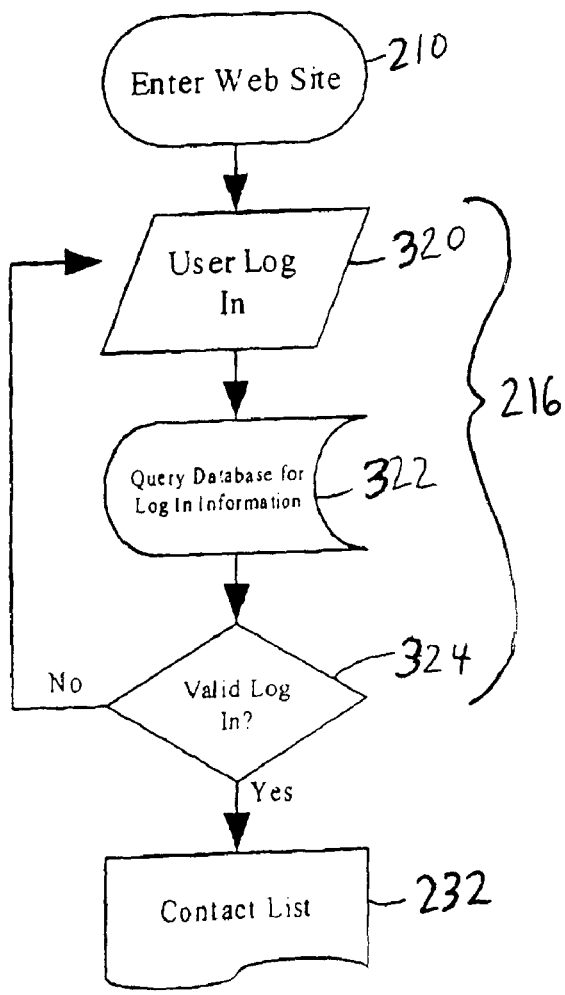
FIG. 3 is a flow diagram of one embodiment of a log in process using the present invention.

FIG. 3 is a flowchart that outlines the process of logging in (step 216) to the website (step 210). Once the User has elected to log in (step 320), the User is prompted for basic information that can include the User's unique identifier, username and/or password, for example. Additional information can also be requested to verify the User's identity. The database 17 is queried (step 322) to determine if the information submitted by the User is consistent with records maintained in the database 17. The database 17 then determines whether or not the log in information, i.e. the password and identifier input by the User matches the corresponding information in the database 17 for the User (step 324) based on the data input by the User at the time of registration (step 224 illustrated in FIG. 2). If it is determined that the log in information provided by the User does not match the information provided at the time of registration (step 224), the log in is invalid. The User is notified that the attempt to log in was unsuccessful, and the User is returned to the User Log In page (step 320). The User can then attempt to log in (step 216) once again, although provisions are included to limit the number of unsuccessful log in attempts over time by a User. If, however, the database 17 determines that the User has correctly provided the required log in information, the log in is valid, and the User is then provided access to the User's contact list (step 232).

Referring back to FIG. 2, once the User accesses his or her contact list (step 232), the User can have one or more options that can be performed in any desired order, which can vary from the order provided herein. Further, each of the options need not be exercised by the User at any given web session. In this embodiment, some of the general functions that the User can perform include editing and/or updating (step 234) the User's own information (step 236) and/or password (step 238) currently in the database 17. The User can also add a new Contact (step 240), and view and/or access information from one or more Contacts (step 242), which can include sending an electronic mail message to the Contact (step 244), sending a text message to the Contact (step 246) and/or accessing a website of the Contact (step 248). The User can also remove a Contact (step 250) from the User's contact list 232. Further, the User can view and/or edit the properties (step 252) of the Contacts, which can include assigning or changing a group for any Contact (step 254), assigning or editing a Clearance Level for any Contact (step 256) and/or adding or removing a Contact to or from the User's Mobile List (step 258). The User can print (step 260) a portion or all of the User's contact list 232, and view a User directory (step 262) of some or all Users that have registered with the system 10. In addition, the User can access an immediate mode of access (step 264) of any Contact (step 266) or the User can edit the User's own immediate mode of access (step 268). Moreover, the User can create or edit a future mode of access schedule of the User (step 270), and/or directly send a text message (step 272) to a Contact, as non-exclusive examples.

It should be recognized that each of the output screens described herein are representative of an output of the database 17 (illustrated in FIG. 1) including information stored in the database 17. Further, the actual screen view of any of the other exemplar screens described herein can vary due to the vast creativity that can be used to generate any screen, including the colors, font, size, layout, functionality, content, sound, etc. For example, the positioning of the functions can be similar to that illustrated in the Figures, or such positioning can vary. The type of functions included on each screen can vary widely from that illustrated in the Figures, provided the requisite functionality is included to carry out the intent of the present invention as provided herein.

Figure 4A:
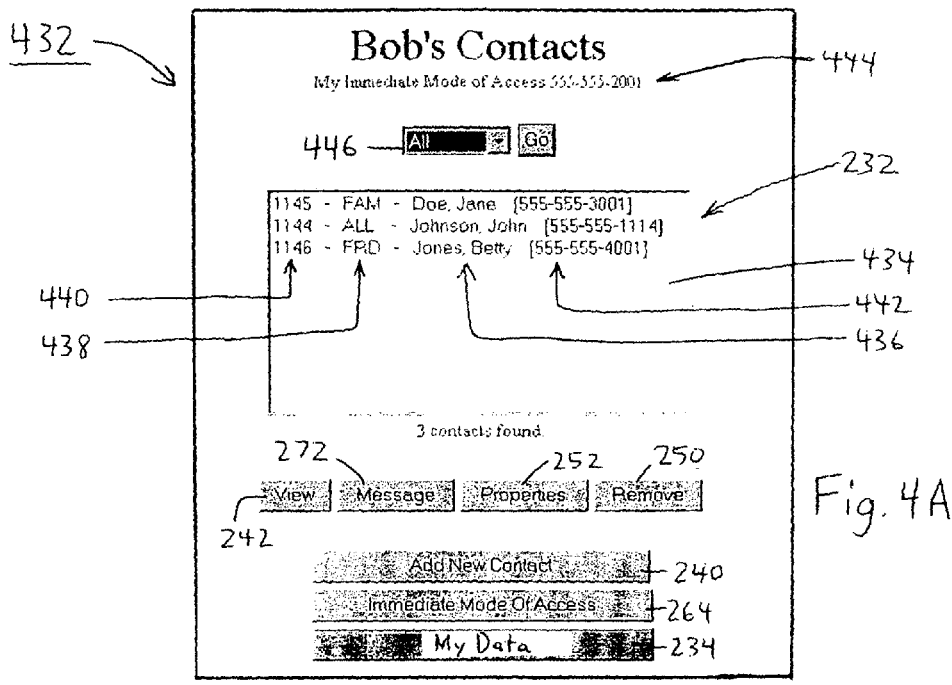
FIG. 4A is an embodiment of a contact list screen having features of the present invention.

FIG. 4A illustrates one representative embodiment of a contact list screen 432 which is accessed once the User gains access to the contact list 232. The screen view illustrated in FIG. 4A is particularly suited for a PC, a notebook computer or the like, which typically utilize screens having relatively large dimensions. Alternatively, appropriately formatted screen views can be used with any wireless devices, such as mobile phones, PDA's, handheld electronic mail devices, pagers, etc., which commonly utilize screens having smaller dimensions.

In this embodiment, a hypothetical User (Bob) has accessed his contact list screen 432, which also includes additional functions that are easily accessible. In the embodiment illustrated in FIG. 4A, three of the User's Contacts appear on the screen in a contact viewing region 434. The amount of information included in the contact viewing region 434 can vary. In one embodiment, a predetermined number of Contacts are accessed in the contact viewing region 434. In an alternative embodiment, the User can specify the number or type of Contacts that can be viewed at one time on the User's contact list screen 432.

In the embodiment illustrated in FIG. 4A, the contact viewing region 434 includes the name 436 of each Contact, a group designation 438 for each Contact, a unique user-specific identifier 440 for each Contact, and an immediate mode of access 442 for each Contact. It is recognized, however, that the amount and/or type of information and the number of functions illustrated in FIG. 4A can be varied to suit the design requirements of the database 17 and the system 10, and that FIG. 4A is merely representative of one example of the contact list screen 432. For example, the information included in the contact viewing region 434 can be customized by the User so that the name of each Contact is on the far left side of the contact viewing region 434, with the other information appearing to the right of the name. Alternatively, for instance, the User may desire more or less information for each Contact to be displayed.

The group designation 438 indicates one or more groups that the User has designated for each Contact. As provided in greater detail below, the User can organize the Contacts into groups that can make the number of Contacts in the User's contact viewing region 434 more manageable.

The user-specific identifier 440 can be any series of numbers, letters or other symbols that the Contact has chosen, or that has been provided to the Contact by the database 17. For example, in FIG. 4A, Jane Doe has either been assigned or has chosen the number 1145 as her user-specific identifier 440.

The immediate mode of access 442 for each Contact instantly provides the User with a specific way that the User can currently access or otherwise contact one or more such Contacts on the User's contact list. The immediate mode of access can also be referred to herein as a "virtual location" or a "means of access". Stated another way, each Contact can determine and then input into the database 17 the precise mode that the User can access such Contact in real time, e.g. at the moment that the User is viewing the immediate mode of access 442. For example, if Bob wants to know how he can reach Betty Jones, Betty has provided her immediate mode of access 442, which is a phone number (555-555-4001) where she can be contacted at that moment in time. From the perspective of Bob, he may be completely unaware of Betty's physical or geographical location, but he knows he can reach Betty using the immediate mode of access 442 Betty has provided. Should Betty update her immediate mode of access 442, Bob's contact list would accurately reflect the updated immediate mode of access 442 input by Betty.

The type of information that can appear as the immediate mode of access 442 can vary depending upon the information provided to the database 17 by each Contact. For instance, the immediate mode of access 442 can be in the form of a home telephone number, a work telephone number, a mobile phone number, an electronic mail address, a pager number, an actual geographical address or location, a message service number such as a text messaging number, or any other suitable mode of access. As a further example, the Contact may be staying at a cabin in the mountains rented by her brother-in-law. The Contact can input a phone number of the cabin or the Contact's mobile phone as the Contact's immediate mode of access 442, and this information can then be accessed by any User with whom the Contact has the appropriate level of reciprocity or has otherwise agreed can view the Contact's immediate mode of access 442, as provided herein.

Alternatively, the Contact is not required to provide any immediate mode of access 442, and can simply leave the data field blank, or choose "None", as non-exclusive examples. Still alternatively, the Contact can provide any specific information she desires, such as directions to a residence, or a note or instruction that she would like certain Users to see upon accessing such Users' own contact lists which show Betty as a Contact. Because of the wide variety of immediate modes of access 442 that can be provided to the database 17 by each Contact, the foregoing examples are merely representative, and are not intended to be limiting in any way.

The User can also view the User's own immediate mode of access 444 from the contact list screen 432. This immediate mode of access 444 is transmitted to all Contacts on Bob's contact list 232 whom Bob has agreed to provide such access, e.g. Contacts on Bob's contact list 232 that have the requisite clearance level, as explained below. This feature allows the User to note what the User has designated as his own immediate mode of access 444, without having to navigate to other areas of the website for such information. For example, in the event Bob has forgotten to change his immediate mode of access 444 from his mobile phone to his home phone once he has arrived home, Bob could instantly see his oversight and change his immediate mode of access 444 accordingly.

In this embodiment, the User can use a group selection menu 446 to determine which groups of Contacts are displayed at a given time. For example, if the User is seeking information from certain family members, the User can select a "Family" group from the group selection menu 446, causing only those Contacts the User has designated as "Family" to appear in the contact viewing region 434. As provided in greater detail below, any number of different types of groups can be used in the group selection menu 446, such as "Family", "Business", "Friends", "All", "Special", etc. With this design, the User can more readily and efficiently access information regarding a specific Contact on the User's contact list without the need of wading through hundreds or thousands of individual Contacts.

The contact list screen 432 can also include additional information and/or functions. For example, from the contact list screen 432 illustrated in FIG. 4A, the User can update or otherwise modify the User's own information. In the embodiment illustrated in FIG. 4A, for example, the User can select a hyperlink entitled My Data 234, which can allow the User to input data specific to the User. In one embodiment, the User is then taken to another screen that provides the User with various options.

Figure 4B:
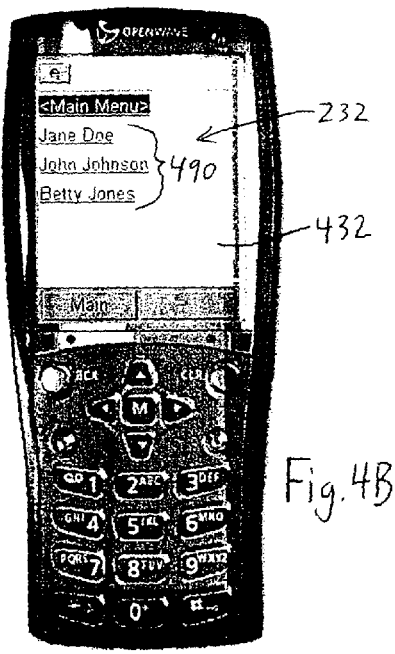
FIG. 4B is another embodiment of the contact list screen having features of the present invention.

FIG. 4B is another embodiment of the contact list screen 432 which is accessed once the User gains access to the contact list 232 from a wireless and/or handheld device such as a mobile phone 14D (illustrated in FIG. 1). In this embodiment, the User may need to navigate through one or more screens to obtain the functionality that can be found in the contact list screen 432 illustrated in FIG. 4A. As illustrated in FIG. 4B, the contact list screen 432 can include the names 490 of the Contacts, through which the User can scroll to locate one or more specific Contacts. Once the specific Contact is located, the User can highlight and select the Contact to reveal another screen which provides various data fields for information input by the Contact.

Figure 4C:
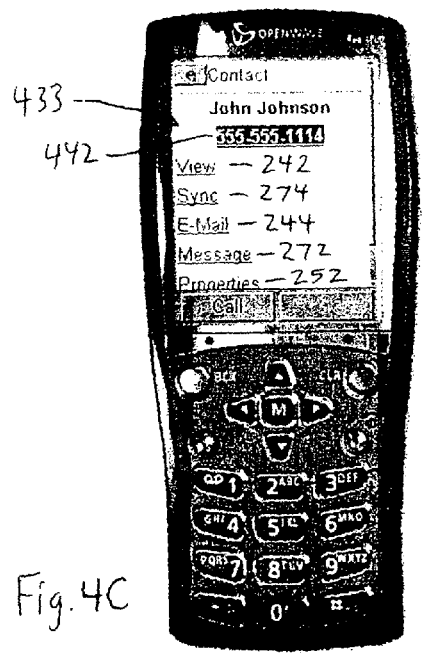
FIG. 4C is an embodiment of a contact screen having features of the present invention.

FIG. 4C is an embodiment of a contact screen 433 that is accessible with a wireless device such as a mobile phone 14D (illustrated in FIG. 1). The contact screen illustrated in FIG. 4C provides the name of the Contact, the immediate mode of access 442 for the Contact, and a list of additional functions that the User can select to navigate to other screens that may contain data input by the Contact or may include additional functionality. In this embodiment, the contact screen illustrated in FIG. 4C includes functions such as viewing the data input by the Contact 242, synchronizing the data input by the Contact with the memory of the mobile phone 274, sending electronic mail to the Contact 244 through the database 17 (illustrated in FIG. 1), sending a text message to the Contact 272, and viewing and/or modifying the User's properties for the Contact 252. It is recognized that additional functions as provided herein can be accessed from the contact screen 433 by scrolling up or down the contact screen 433, or by selecting one of the visible functions illustrated in FIG. 4C.

Figure 5A:
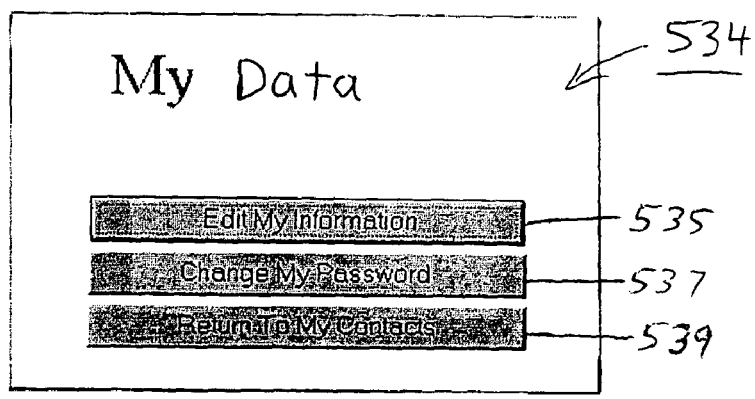
FIG. 5A is an embodiment of a user data screen having features of the present invention.

FIG. 5A is an example of a user data screen 534 on which the User can edit the User's own information 535, change the User's password 537, or return 539 to the User's contact list screen 432 (illustrated in FIG. 4A). It is recognized that additional options can also be provided to the User. However, for the sake of simplicity, the user data screen 534 includes only the foregoing options. Further, as with any of the screens provided herein, the title of the screen is provided for convenience only, and can vary from those indicated herein.

Figure 5B:
FIG. 5B is an embodiment of a customizable data screen including a plurality of data fields.

FIG. 5B is one embodiment of an edit Information screen 535A that the User can be taken to in order for the User to enter, manipulate, modify or otherwise update the User's own data in the database 17 (illustrated in FIG. 1). In this embodiment, the User can input data into one or more data fields 541 (various examples illustrated in FIG. 5B). Any number of data fields 541 can be included on this screen 535A. Further, the type of information requested in each data field 541 can be varied to suit the design requirements of the system 10. For example, in the embodiment illustrated in FIG. 5B, the User can input data into the database 17 relating to personal information, home address and phone numbers, work information, and on-line and/or mobile device information as non-exclusive examples. In one embodiment, the data fields 541 can be categorized, as illustrated in FIG. 5B. Alternatively, the data fields 541 can be separated by additional or different categories, or not categorized at all.

Any relevant data can be requested and input into the database 17 by the User. For instance, the data fields 541 can request information relating to the User's medical condition, financial information, insurance information, legal information, important dates, family history, personal notes by the User, and/or basically any other information that may be desirable or useful to one or more of the User's Contacts, and which the User wants to provide to such Contact(s). It should be recognized that the data fields 541 illustrated in FIG. 5B are not in any way intended to be limiting in the type of information and/or data that can be provided by the User into the database 17. For example, data that can be provided to and/or retrieved from the database 17 can not only include text information, but such data can also include audio and/or video information.

Additionally, in one embodiment, the User is also requested to select a privacy level 543 for one or more data fields 541. In general, the privacy level 543 is used in conjunction with a clearance level (not shown in FIG. 5B) that the User assigns to each Contact to customize which data fields 541 of the User each Contact in the User's contact list will be able to view, as described in greater detail below. In the embodiment illustrated in FIG. 5B, the User can select the privacy level 543 from a drop-down menu. Alternatively, the privacy level 543 can be manually input, or selected in any other suitable manner. In another embodiment, a default privacy level 543 is provided for each data field 541, e.g. "Medium", although the default privacy level setting can be established at any level as required by the User.

In this embodiment, the User can specify the privacy level to be "High", "Medium" or "Low". However, any type of hierarchical levels can be used. For example, a scale of 1 to 5, first to tenth, none to all, least to most, or any other suitable scale can be used. As an overview, provided the clearance level assigned to the Contact is at least as great as the privacy level 543 of a particular data field 541, the Contact will be able to view such data field 541. Conversely, if the clearance level for the Contact is hierarchically lower than the privacy level 543, the Contact will not be able to view the particular data field 541.

In an alternative embodiment, the User can toggle each data field 541 between an "on" position and an "off" position for each Contact. In this embodiment, no clearance level needs to be assigned to the Contact because access to the data fields 541 by the Contact are solely controlled by this binary type of privacy level 543.

Once the User has input data into the database 17 to the User's satisfaction, the User can then be asked to update the database 17 or cancel the recently-input data.

Additionally, the User can elect to change the User's password. For example, from the user data screen 534 (illustrated in FIG. 5A), the User can select the Change My Password hyperlink 537 which will take the User to a screen (not shown) that allows the User to change the User's password for security reasons or any other purpose. Additionally, the User can select a Return to My Contacts hyperlink 539 that takes the User back to the User's contact list screen 432 (illustrated in FIG. 4A).

The User can add any number of Contacts to the User's contact list 232. In one embodiment, the User can select an Add New Contact 240 option from the contact list screen 432 (illustrated in FIG. 4A). By selecting this option, the User can be taken to another screen having functionality allowing the User to add a Contact.

FIG. 6A is an embodiment of an add new contact screen 640, which can be accessed from the "Add New Contact" hyperlink 240 (illustrated in FIG. 4A). From the add new contact screen 640, the User can specify a desired Contact that the User desires to add to the User's contact list 232 (illustrated in FIG. 4A). In this embodiment, the User can input an electronic mail address of the desired Contact, or can input the user-specific identifier, e.g. #1001, of the Contact if known to the User. In alternative embodiments, the User can input any other relevant information that will specifically identify the desired Contact. Still alternatively, the User can utilize a hyperlink from the User directory 262 (depicted in FIG. 2), as described in greater detail below.

Further, in the embodiment illustrated in FIG. 6A, the User can select an initial clearance level 642 for the desired Contact. As indicated above, the clearance level 642 operates in conjunction with the privacy level 543 (illustrated in FIG. 5B) to determine which data fields 541 (illustrated in FIG. 5B) entered into the database 17 by the User the Contact will be able to view. In an alternative embodiment, the clearance level can be assigned to the desired Contact at a later point in time, e.g. once the desired Contact authorizes the User to gain access to the desired Contact's data.

The User can select from a plurality of clearance levels 642 for each Contact, which can be in the form of a drop-down menu 644 or another suitable method for selecting the clearance level 642. Similar to the privacy level 543 designations, the clearance level 642 designations can vary. In one embodiment, the clearance levels 642 are hierarchical such that the clearance level 642 can be either "High", "Medium" or "Low". In this example, a Contact assigned by the User with a "High" clearance level 642 can have access to a greater number of the User's data fields 541 than a Contact having a "Medium" or "Low" clearance level 642. Further, a Contact having a "Medium" clearance level 642 can have access to a greater amount of the User's data than a Contact having a "Low" clearance level 642. With this design, the User can control and/or customize the amount of data, and the specific types of data, that can be accessed by each Contact in the User's contact list.

Alternatively, the clearance levels 642 can be on a numeric scale, i.e. 1 through 3, 1 through 5, 1 through 10, etc. Still alternatively, any other suitable hierarchical system can be utilized for determining clearance levels 642. Generally, the greater number of designations for the clearance levels 642 and privacy levels 543, the more precisely the User can control the Contact's access to the User's data in the database 17. In one embodiment, the clearance level 642 of the Contact is not specifically revealed to the Contact, but is only manifested by the extent of information to which the Contact has access from the User. Alternatively, the Contact can be provided with access to the clearance level 642 that has been assigned by the User for that Contact. In either event, the Contact is unable to directly modify the clearance level 642 assigned to that Contact by the User.

Once the user-specific identifier and the clearance level are input into the database 17 by the User as illustrated in FIG. 6A, the database 17 is queried to determine if the user-specific identifier is valid, or if the user-specific identifier is a duplicate Contact on the User's contact list 232. If the user-specific identifier is valid and is not a duplicate in the User's contact list 232, the database 17 is queried to insert specified information of the new Contact into the User's contact list 232. In one embodiment, if the User is already authorized by the Contact to view some or all of the Contact's data, the name of the Contact can appear in the User's contact list 232. If the User is not authorized to view the Contact's information, in one embodiment, only the user-specific identifier or other non-personal information appears in the User's contact list 232.

FIG. 6B is an embodiment of a notification screen 646 which confirms to the User that the User has added a desired Contact to the User's contact list 232 (illustrated in FIG. 4A). In the embodiment illustrated in FIG. 6B, the User has added a Contact with the user-specific identifier of #1001. Further, in one embodiment, the desired Contact can be sent an electronic mail message requesting action on the part of the desired Contact to either accept or reject the User's request for authorization. The electronic mail message can be customizable so that the User can personalize the message to the desired Contact. Alternatively, the electronic mail message can be predetermined and unalterable.

Figure 6C:
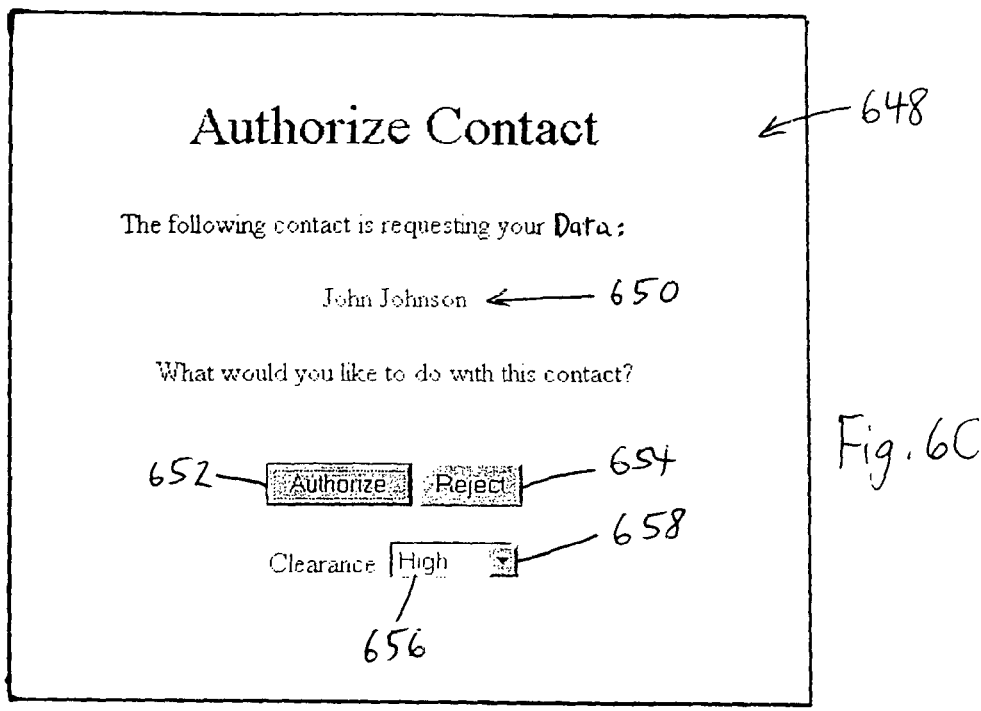
FIG. 6C is an embodiment of an authorization request screen having features of the present invention.

FIG. 6C is an embodiment of an authorization screen 648 that can be sent by the database 17 (illustrated in FIG. 1) to the desired Contact following the User adding the desired Contact to the User's contact list 232 (illustrated in FIG. 4A). In this embodiment, the desired Contact can be taken directly to this authorization screen 648 upon logging on to the system 10. Alternatively, the desired Contact can be directed to the authorization screen 648 at another time while using the system 10.

In this embodiment, the desired Contact is provided the name 650 of the person or entity (John Johnson) requesting authorization from the Contact. The desired Contact is requested to either authorize 652 the User to gain access to some or all of the desired Contact's data, or reject 654 such authorization, thereby denying any access by the User to the data input by the Contact into the database 17. In the event the desired Contact provides authorization to the User, the Contact can then select a clearance level 656 that is applicable only to John Johnson from a drop-down menu 658 or another suitable selection method. With this design, the Contact can control the data input by the Contact to which John Johnson has access, as described herein.

Figure 6D:
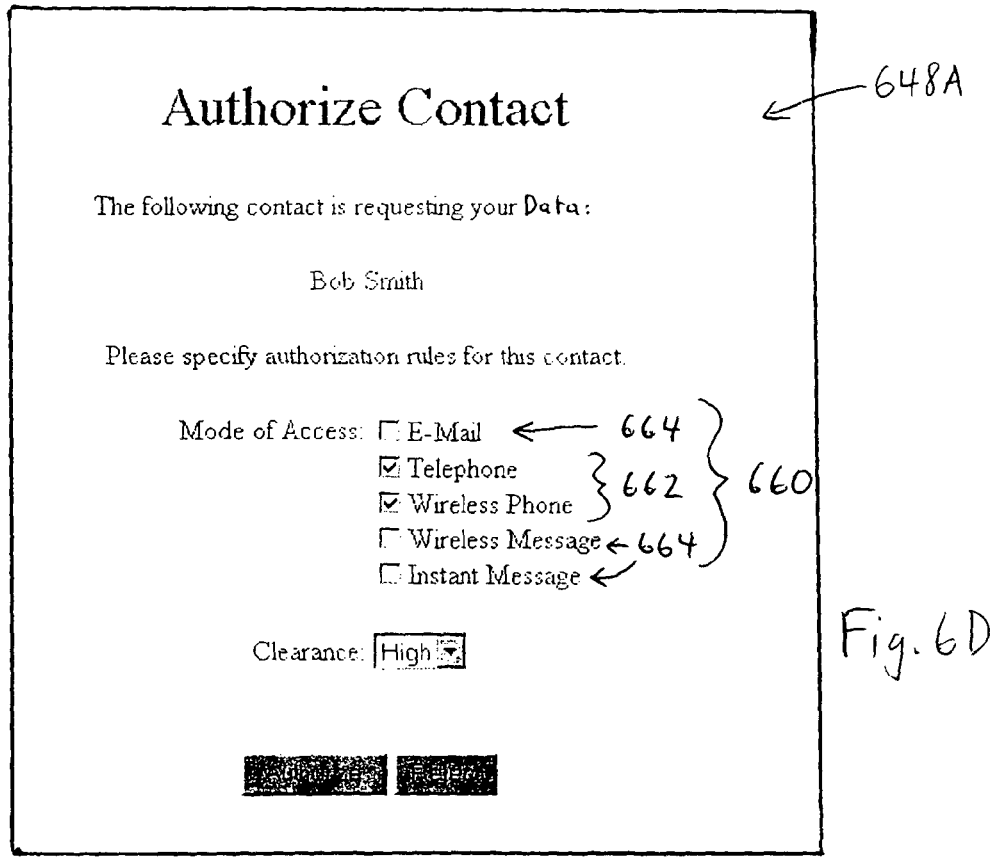
FIG. 6D is another embodiment of the authorization request screen having features of the present invention.

FIG. 6D is another embodiment of the authorization screen 648A that can be sent by the database 17 (illustrated in FIG. 1) to the desired Contact following the User adding the desired Contact to the User's contact list 232 (illustrated in FIG. 4A). In this embodiment, the Contact can also determine which modes of access 660 the User is authorized to use in order to communicate with the Contact. In this embodiment, the Contact can select among various predetermined modes of access 660, such as electronic mail, telephone, wireless phone, wireless message, and instant message, which are provided merely as representative examples. It is recognized that numerous other modes of accessing an individual or entity exist, and that the present invention can be equally effective with any such mode of access 660.

In this embodiment, the Contact has authorized the User to access specific modes of access 662 indicated by the Contact, namely, telephone and wireless phone. Thus, when the User views the data of the Contact, the User will be provided access to the Contact's telephone number(s) and wireless phone number(s). Further, the Contact has determined that the authorized modes of access 662 for the User to communicate with the Contact are also by telephone and wireless phone. To the extent that the system 10 controls direct access between the User and the Contact using the stated modes of access 660, any attempt by User to view an unauthorized mode of access 664, and/or contact the Contact by such unauthorized mode of access, i.e. electronic mail, wireless message or instant message, would be denied by the system 10. With this design, the system 10 can inhibit or prevent contact between the User and the Contact by modes not authorized by the Contact, thereby reducing unwanted solicitations, spammers, telemarketers, and the like.

Figure 6E:
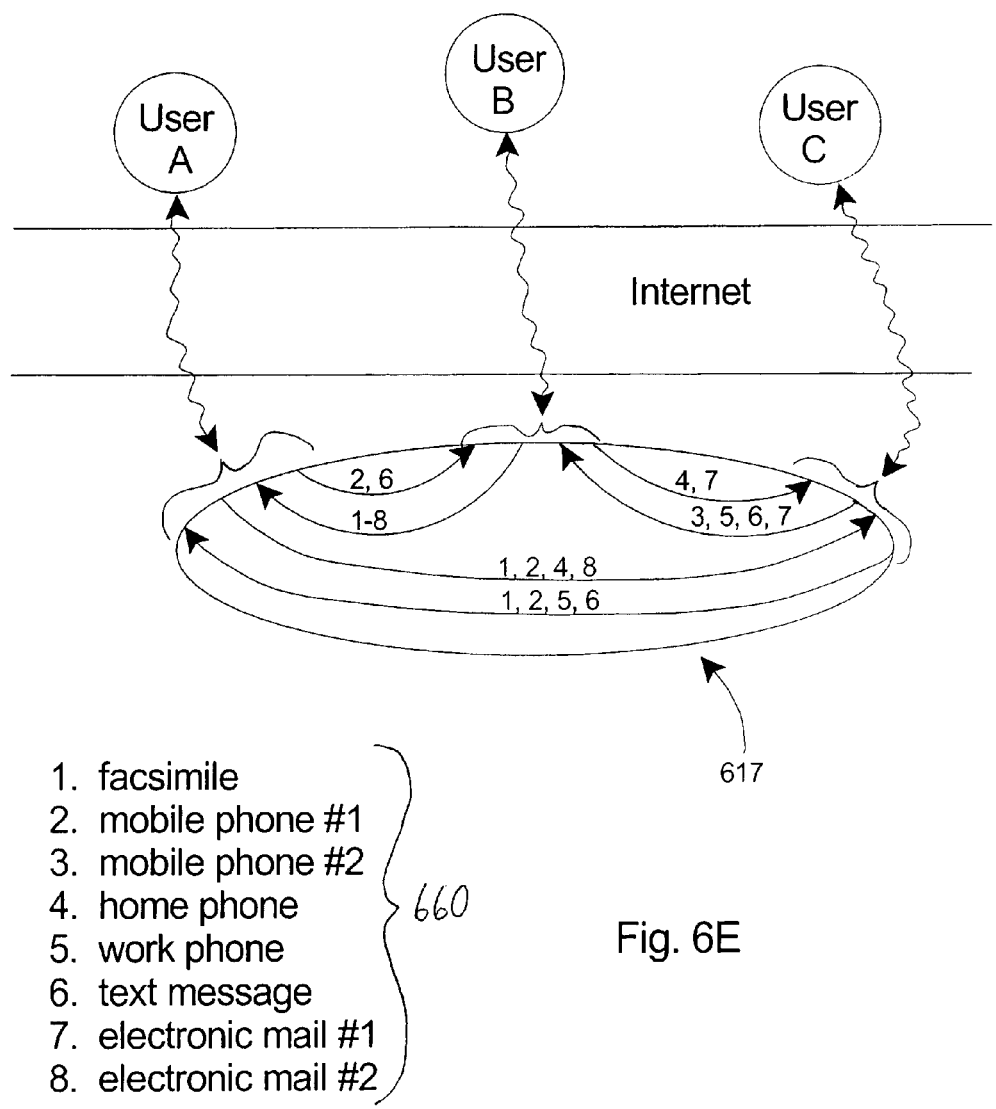
FIG. 6E is a diagram illustrating authorization of one or more modes of access between a plurality of Users of the computer system.

FIG. 6E is a simplified diagram illustrating one embodiment of how each User can use the authorization process outlined in FIG. 6D to specify one or more modes of access 660 for each Contact on the User's contact list. In this manner, the User can control (i) access to data which includes particular modes of access 660 of one or more other Users, and/or (ii) by which modes of access 660 such User can be contacted by one or more of the other Users. In this embodiment User A, User B and User C have authorized each other to access some or all of each other's data in the database 617. As illustrated in FIG. 6E, each User accesses the database 617 via the Internet. Specifically, User A can authorize User B to access any of the eight modes of access 660 (1-8) listed in FIG. 6E so that when User B retrieves User A's data from the database 17, User B will be allowed to view each of the numbers (or other data) associated with the eight specified modes of access 660. Additionally or alternatively, User A can authorize User B to utilize any of the eight modes of access 660 (1-8) to communicate with User A. In this example, User B has authorized User A to access User B's mobile phone #1 and text message number modes of access 660 (2 and 6), and/or has authorized User A to utilize either of these modes of access 660 (2 and 6) to communicate with User B.

Somewhat similarly, User A has authorized User C to access User A's facsimile, mobile phone #1, work phone and text message number modes of access 660 (1, 2, 5 and 6), and/or has authorized User C to utilize the same modes of access 660 to communicate with User A. User C has authorized User A to access User C's facsimile, mobile phone #1, home phone and electronic mail #2 modes of access 660 (1, 2, 4 and 8), and/or has authorized User A to utilize the same modes of access 660 to actually communicate with User C.

In this example, User B also has authorized User C to access User B's mobile phone #2, work phone, text message number and electronic mail #1 modes of access 660 (3, 5, 6 and 7), and/or User B has authorized User C to utilize such modes of access 660 to actually communicate with User B. User C has authorized User B to access User C's home phone and electronic mail #1 modes of access 660 (4 and 7), and/or User C has authorized User B to utilize these same modes of access 660 to communicate with User C.

FIG. 6F is an embodiment of a confirmation screen 668 that the Contact can receive once the Contact has authorized the User (John Johnson) to gain access to some or all of the Contact's data input by the Contact into the database 17 (illustrated in FIG. 1). As indicated, an electronic mail can also be automatically sent to the User, notifying the User that the Contact has accepted the User's request for authority for the User to access the Contact's data from the database 17.

The methodology for adding a Contact can vary depending upon the design requirements of the database 17. When adding a desired Contact, this Contact may or may not already be registered with the system 10. If the desired Contact has previously registered (step 214 illustrated in FIG. 2) with the system 10, a first protocol can be followed by the database 17. If the desired Contact has not previously registered with the system, a second protocol can be followed. The first and second protocols can vary depending upon the requirements of the system 10.

In one embodiment of the system 10, the database can require reciprocity between the User and the Contact before (i) any data input into the database 17 by the Contact can be accessed by the User, or (ii) any data input into the database 17 by the User can be accessed by the Contact. Thus, in this embodiment, in order for the User to gain access to at least a portion of the data input by the Contact, the User must also provide the Contact with access to at least a portion of the data input by the User. Stated another way, in this embodiment, there must be a reciprocal agreement between the User and the Contact to share information, although the extent of the information shared can vary so that the information shared can be disparate as between the User and the Contact. In other words, the User may agree to provide the Contact with access to certain data fields 541 (illustrated in FIG. 5B), while the Contact agrees to provide the User with access to all data fields 541.

In an alternative embodiment, the User and the Contact must agree to share information between them to a substantially similar degree. For example, the system 10 can require that both the User and the Contact have clearance levels 642 (illustrated in FIG. 6A) that are either the same, or within a predetermined number of hierarchical steps from one another. In yet another embodiment, the agreement to share does not need to be reciprocal unless one of the User and the Contact so declares. In still another embodiment, the User can manually enter information and/or data relating to a Contact who has not as yet authorized the User to access the Contact's data from the database, or who has not as yet registered with the system 10.

For example, in embodiments where a reciprocal agreement is required between the User and a desired Contact, in one embodiment of the first protocol, the User can begin the process of adding the desired Contact by inputting the appropriate user-specific identifier for the new Contact when prompted by the database 17. Alternatively, the User can input different information specific to the Contact such as an electronic mail address of the Contact, the username of the Contact, or some other appropriate designation for the Contact. Thus, in one embodiment, the User must know some information about the Contact in order to begin the process of adding the Contact to the contact list of the User, thereby reducing unwanted requests for authorization from persons or entities unknown to the desired Contact. Alternatively, the User can simply input the name of the desired Contact, which can be input by the User, or can be taken from a user directory 262 (illustrated in FIG. 2) which lists one or more of the users of the database 17, as described in greater detail below. Once the User has input the required information into the database 17, the Contact can then be notified by the database 17 or by other means that the User is attempting to establish a data link to exchange information with the Contact.

At this point, the Contact can have the option of accepting the request, thereby establishing the reciprocity necessary to exchange information. If the Contact elects to accept the request, the Contact can also be asked to input a clearance level for the User. In other words, because the Contact would understand that the User and the Contact will have a reciprocal agreement, the Contact can have the opportunity to determine the extent that the User will be able to access information of the Contact from the database 17. Alternatively, the Contact can reject the request, at which point the User would not have the required reciprocity, and would not have access to any of the Contact's data that may be stored on the database 17. In this event, the User can be notified of such rejection by the Contact via electronic mail, by a message from the server 12, or by another mode of accessing the User. Further, in one embodiment, the User can no longer request authorization from such Contact.

With the second protocol, the desired Contact can receive notification that the User is attempting to add the desired Contact to the User's contact list. This notification can be sent to the Contact by electronic mail, or by any other suitable means. Further, the notification can include information regarding the functions of the system 10, along with a hyperlink to the website 210 (illustrated in FIG. 2) on which the database 17 can be accessed. Moreover, the desired Contact can be requested to register with the system 10, and accept User's request that the User and the desired Contact be linked in order to exchange information from the database 17. Once the desired Contact has registered with the system, reciprocity can be achieved using the first protocol described above, for example.

FIG. 6G is a portion of a simplified table that can be maintained in the database 17 (shown in FIG. 1) illustrating the requirement for reciprocity between a User and a Contact. In this embodiment, the User 670 is identified within the database as "19". The first column shows identification numbers of certain Users 670 that have input their data into the database 17. The second column shows identification numbers of certain Contacts 672 that are on the contact list 232 (illustrated in FIG. 4) of the respective Users 670 in the same horizontal row. The third column identifies the clearance level 656 that the owner 670 has assigned to the Contact 672 in the same horizontal row.

For example, the first row 674 shows a User "1", a Contact "19" and a clearance level of "3". To the database 17, this means that the Contact "19" is on the contact list of the User "1", and the User "1" has assigned a third level clearance level 656 to the Contact "19". However, in this embodiment, unless another row having reciprocal information is present, the database 17 will not allow the exchange of data between the User "1" and the Contact "19" to occur. As illustrated in the fifth row 676, the required reciprocity exists. In the fifth row 676, the User "19" has authorized the Contact "1" at the third level clearance level 656. Therefore, because "1" has authorized "19", and "19 has authorized "1", the database 17 will allow "1" and "19" to exchange and/or access the information of the other.

In contrast, FIG. 6G illustrates that the same reciprocity is not present between Users "17" and "19". In this example, User "17" has authorized Contact "19" to access some or all of the data of User "17" in the fourth row 678, but User "19"

has not authorized Contact "17" to access the data of User "19". Thus, because there is no reciprocity between these Users, no data can be accessed by either User "17" or "19" when reciprocity is required.

Figure 6H:
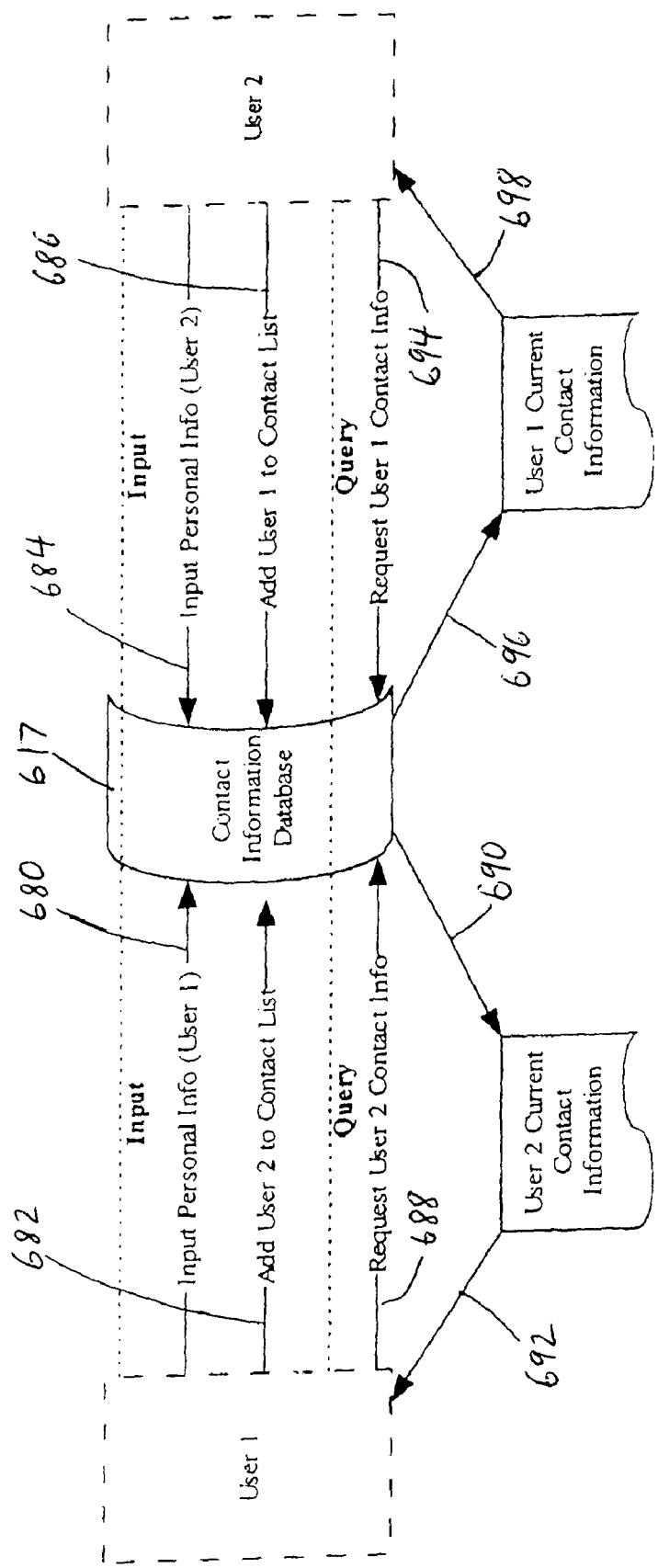
FIG. 6H is a flow diagram illustrating a requirement for reciprocity between a plurality of Users of the computer system.

FIG. 6H is a flow diagram further illustrating an embodiment of the present invention wherein the exchange of data requires reciprocity. The example illustrated in FIG. 6H includes two Users utilizing the present invention. Although only two Users are described, it should be recognized that the system 10 can be used by thousands or even millions of Users in the same manner. Further, although FIG. 6H refers to "personal" information and "current contact information", it is recognized that the system 10 provided herein is equally effective with all types of information.

In this example, User 1 inputs User 1's data to the database 617 at step 680. User 1 also adds User 2 to User 1's contact list at step 682. In this embodiment, no information can be exchanged between User 1 and User 2 at this point. At step 684, User 2 inputs User 2's data into the database 617. Further, User 2 adds User 1 to User 2's contact list at step 686. At this point in time, User 1 and User 2 have reciprocal access to each other's data. Once User 1 requests User 2's data at step 688, the data will be retrieved from the database 617 at step 690 and will be displayed to User 1 at step 692. Somewhat similarly, once User 2 requests User 1's data at step 694, User 1's data will be retrieved from the database 617 at step 696 and displayed to User 2 at step 698. The extent of the data received by each User can vary depending upon the clearance levels and the privacy levels of each User, as provided herein.

Referring back to FIG. 2, the User can view the data 242 input by one or more of the Contacts on the User's contact list 232. In one embodiment, the User highlights a Contact on the contact list, and selects a "View" option 242. The database 17 (illustrated in FIG. 1) is then queried to determine if the User is authorized to view the information of the specific Contact selected, e.g. if reciprocity is required, has the Contact authorized the User to access some or all of the Contact's data? If the User is authorized, the clearance level and privacy level settings are queried from the database 17.

As an overview, the privacy level settings are queried to determine how secure or restricted the Contact wants each field of the Contact's data to be. In one embodiment, each data field has a privacy level setting that can be established by the Contact. In alternate embodiments, only certain fields can have privacy level settings. Based on the results of the query, the database 17 determines to what extent, if any, the User is authorized to view the data input into the database 17 by the Contact. For example, if the Contact has not authorized the User to view the Contact's personal information, then the User is notified by the server 12 that he or she does not have access to the requested Contact's information. On the other hand, if the Contact has authorized the User to view any portion of the Contact's information, the information is displayed to the User in accordance with the clearance level that has been established by the Contact for the specific User.

Figure 7A:
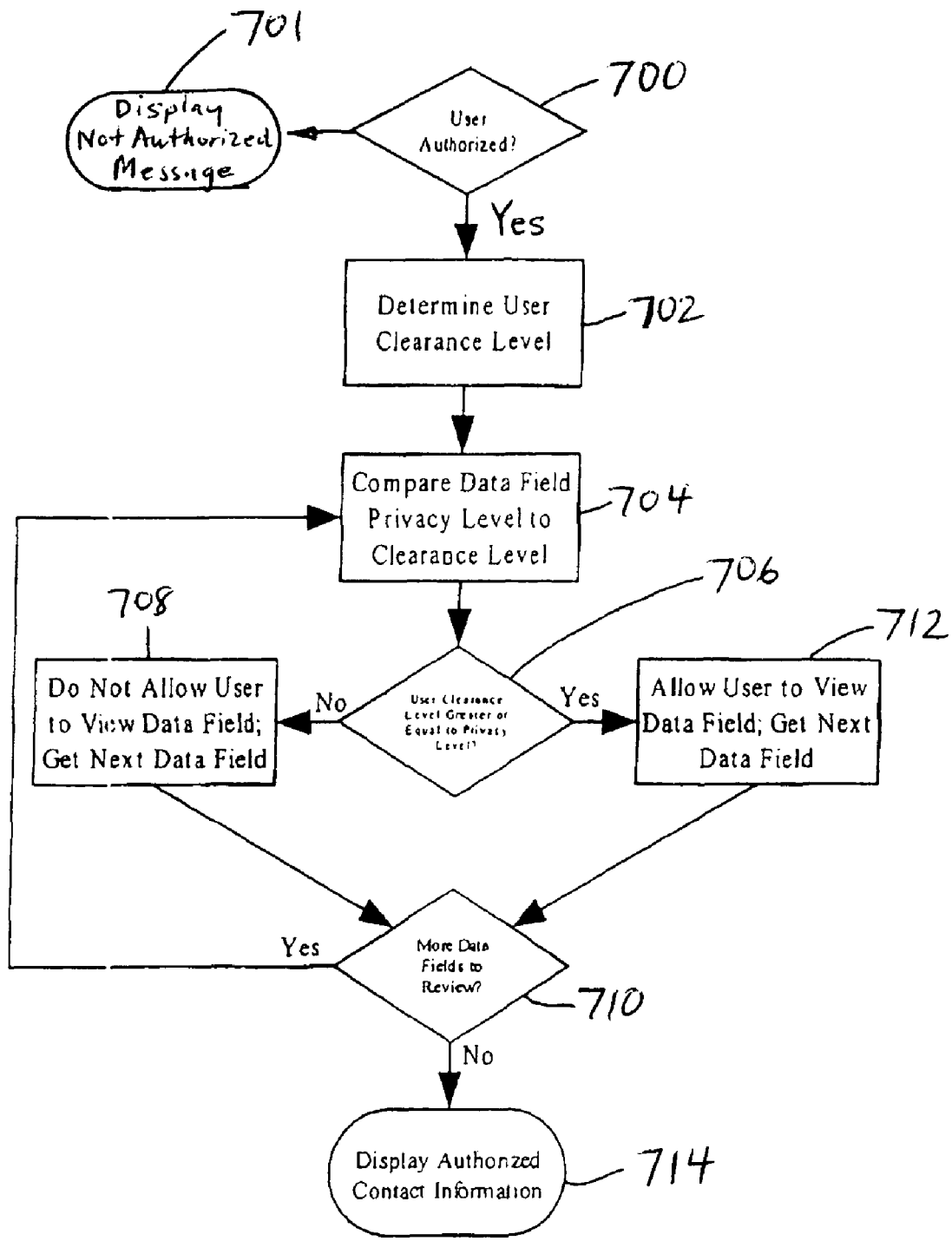
FIG. 7A is a flow diagram illustrating one or more determinations by the database for providing access to data between a plurality of Users of the computer system.

FIG. 7A is a flow chart illustrating in greater detail one embodiment of the determination by the database 17 (illustrated in FIG. 1) of the extent to which the User can view the Contact's data in the database 17. In this embodiment, a query of whether the User has authorization to view the data from a selected Contact occurs at step 700. As provided above, authorization can occur when the Contact adds the User to the Contact's contact list or otherwise authorizes the User as provided herein. If authorization has not occurred, a "not authorized" message is displayed at step 701. At step 702, the specific clearance level by the Contact for the selected User is determined.

At step 704, for each data field of the Contact, the privacy level of the data field is compared to the clearance level assigned to the User by the Contact. The privacy level of each data field can be measured against the clearance level to inhibit unauthorized information from being provided to the User. At step 706, the database 17 is queried to determine if the User's clearance level is greater than or equal to the privacy level setting for a first data field. If it is not, the User is not allowed to view the first data field at step 708. If the clearance level is greater than or equal to the privacy level setting for the first data field, the data is retrieved at step 712 for eventual display to the User.

Regardless of the outcome for the first data field at step 706, the database 17 is then queried to determine if there are additional data fields to review at step 710. If there are additional data fields to review, e.g. a second data field, then the process returns to step 704, and steps 704 through 710 are repeated until there are no more data fields to review. Once there are no more data fields to review, a display of the authorized information is provided to the User at step 714.

FIG. 7B illustrates an embodiment of a contact data screen 714B that can be displayed to a User who has requested to view information from John Johnson having a user-specific identifier of #1144, for example. In this embodiment, the name, birthdate, home address, work address, a plurality of phone numbers, e-mail addresses and a website of the Contact are displayed to the User. It is recognized that FIG. 7B represents only one of any number of possible displays of information, which can vary depending at least in part upon the information input by the Contact, the clearance level of the User as determined by the Contact, and the privacy level settings established by the Contact.

The contact data screen 714B can also include hyperlinks which allow the User to perform various functions directly from the contact data screen 714B. For example, the User can use a keyboard, mouse or other device to highlight and/or click on an electronic mail hyperlink 716, which can take the User to another screen or electronic mail program which would allow the User to compose and send an electronic mail message to the Contact. Additionally, the User can access a website input by the Contact using a website hyperlink 718. Further, the contact data screen can include a button, control or hyperlink so the User can send the Contact a text message, multimedia message or other message 720.

Figures 7C, 7D:
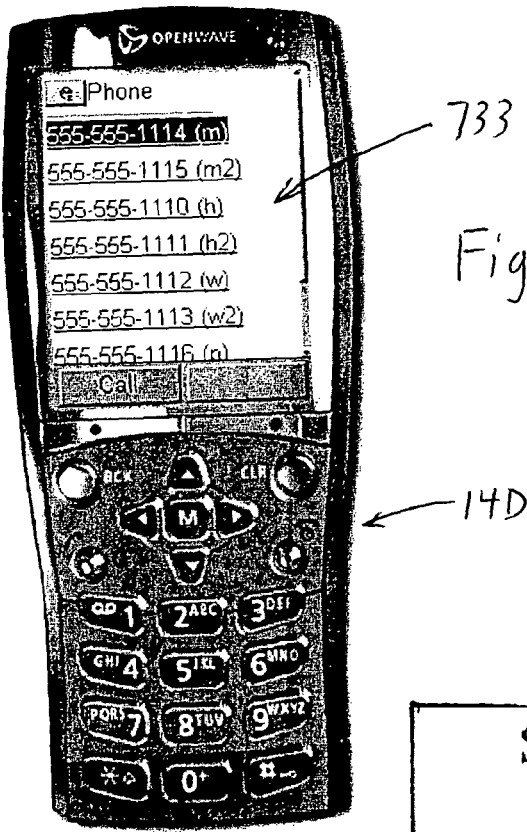
FIG. 7C is another embodiment of the contact view screen having features of the present invention.
FIG. 7D is an embodiment of a text message screen having features of the present invention.

FIG. 7C is an embodiment of a view screen 733 that is accessible with a wireless device such as a mobile phone 14D. In this embodiment, once the User selects one of the User's Contacts, the User can be taken to a listing of current phone numbers and other relevant data that the Contact has input into the database 17 (illustrated in FIG. 1). The User can then scroll through the data to locate the specific information sought by the User relative to the Contact. In the event the User desires to contact the Contact, the User can highlight and select an appropriate phone number such as the immediate mode of access (not shown in FIG. 7C) to expeditiously call the Contact. Because the Contact has input the phone numbers and other data that the User is accessing, the User has an increased assurance that the data is up-to-date.

FIG. 7D is an embodiment of a text message screen 720D to which the User can be taken following such a request by the User from the contact data screen illustrated in FIG. 7B. In the embodiment illustrated in FIG. 7D, the database 17 (illustrated in FIG. 1) can automatically provide a selection of various phone numbers, pager numbers, or numbers from other devices from which the User can choose to send a text message to the Contact. For example, the database 17 can automatically set up the text message screen 720D to include a data field for the Contact's name or nickname 722, for example. Further, the text message screen 720D can include all mobile device numbers 724, the immediate mode of access of the Contact, and/or an "other" data field 726 that the User can utilize to customizably input another number that indicates where the text message is to be sent.

In addition, the text message screen 720D can include a data field for the User's name or nickname 728, and a "call back" or reply number 730 for the User, which can be selected from a drop-down menu 732, or from a listing (not shown) taken from the User's data stored on the database 17. The text message screen 720D also includes a message data field 734 so the User can input a text message. In this embodiment, the text message screen 720D can also include a character counter 736.

FIG. 7E is another embodiment of a text message screen 720E that is used when the User desires to send a text message or other type of message. The text message screen 720E illustrated in FIG. 7E is particularly suited for use with a wireless device such as a mobile phone 14D. In the embodiment illustrated in FIG. 7E, the database 17 (illustrated in FIG. 1) can automatically provide a selection of various numbers 724E, including the Contact's immediate mode of access, or other phone numbers, pager numbers, or numbers from other devices from which the User can select to send a text message to the Contact. Further, the text message screen 720E illustrated in FIG. 7E can include an "other" data field (not shown in FIG. 7E) that the User can utilize to customizably input another number that indicates where the text message is to be sent. In addition, the text message screen 720E can include a "call back" or reply number 730E for the User, which can be selected from a list of numbers previously input by the User and stored in the database 17.

FIG. 7F is another embodiment of a text message screen 720F that the User can be taken to following selection of the appropriate numbers 724E, 730E (illustrated in FIG. 7E) on the User's mobile phone 14D. Alternatively, the text message screen illustrated in FIG. 7F can appear when the User scrolls up or down from the text message screen 720E illustrated in FIG. 7E. In this embodiment, the text message screen 720F also includes a message data field 734F so the User can input a text message. Additional functions 736F can be accessed by the User which allow the User to send or cancel the message, for example.

Figures 7G, 7H:
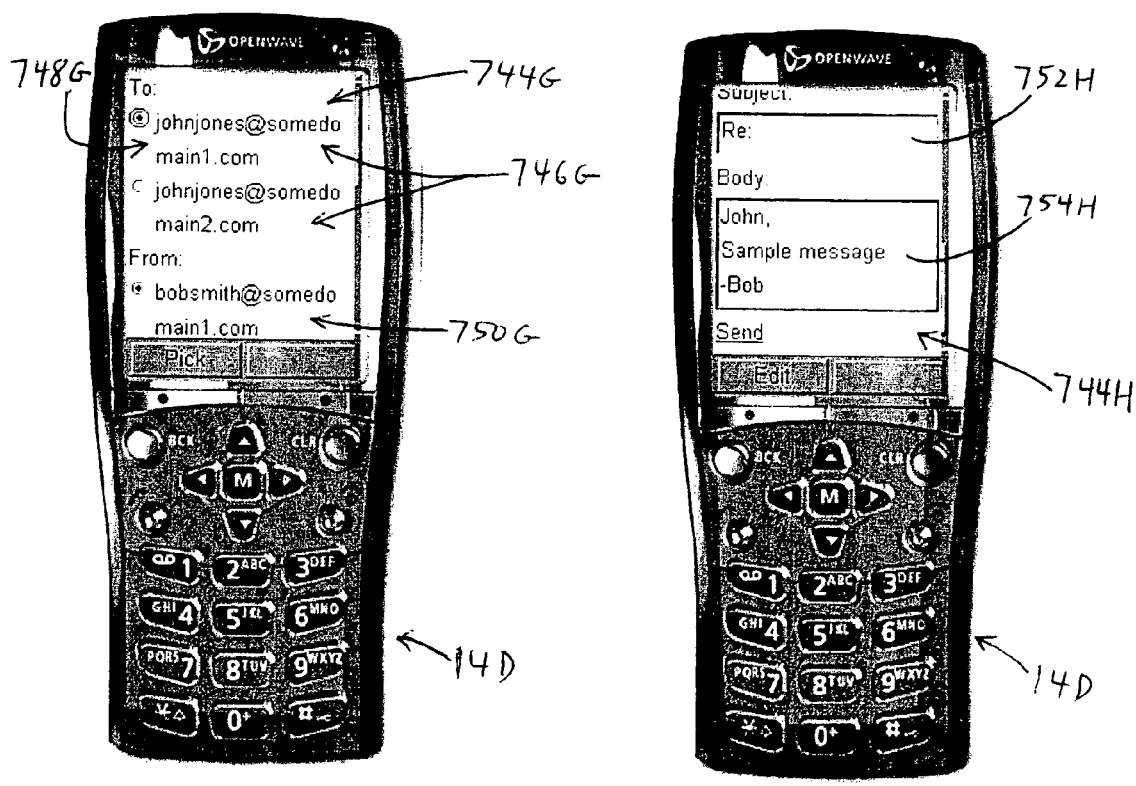
FIG. 7G is an embodiment of an electronic mail screen having features of the present invention.
FIG. 7H is another embodiment of the electronic mail screen having features of the present invention.

FIG. 7G is an embodiment of an electronic mail screen 744G that can be accessed by a User using a mobile device such as a mobile phone 14D. On this screen 744G, the User can access one or more electronic mail addresses 746G of a Contact from the Contact's data stored on the database 17 (illustrated in FIG. 1), from which the User can select the appropriate electronic mail address 748G to use for sending an electronic mail message to the Contact. Further, the User can also select from one or more previously input electronic mail addresses 750G (only one such address 750G is shown in FIG. 7G) of the User for a return address.

FIG. 7H is another portion of an electronic mail screen 744H that can be accessed by a User using a mobile device such as a mobile phone 14D. On this screen 744H, the User can input a subject 752H and an electronic mail message 754H to be sent to a specified Contact.

FIG. 8 is an embodiment of a remove contact screen 850 that allows a User to remove a Contact from the User's contact list 232 (illustrated in FIG. 2). Once the User removes the Contact, the Contact can no longer access any data of the User from the database 17 (illustrated in FIG. 1). Thus, in this embodiment, any break in the reciprocity of authorization between the User and the Contact results in neither the User nor the Contact having access to the other's data from the database 17.

FIG. 9A is an embodiment of a contact properties screen 952 that the User can access following selection of the properties hyperlink 252 (illustrated in FIG. 4A) from the contact list screen 432 (illustrated in FIG. 4A) to view and/or adjust certain properties of one or more of the User's Contacts. In the example illustrated in FIG. 9A, the User has accessed the properties for Contact John Johnson. The functions included on the contact properties screen 952 can vary. In the embodiment illustrated in FIG. 9A, the User can (i) view and/or modify a group setting 954 of the Contact, (ii) view and/or modify the clearance level 956 of the Contact, and/or (iii) view and/or modify a mobile list setting 958 for the Contact.

The group setting 954 allows the User to determine one or more specific groups with which the Contact can be associated. For example, the User can select from predetermined group settings 954 such as "Business, "Friends", "Family", "All", "Special", etc., or the User can customize the name of the group, e.g. "Golf". The User can specify a group setting 954 for one or more Contacts in the User's contact list. Consequently, when the User is scrolling through the User's contact list, the User can temporarily exclude various Contacts from the list by selecting a particular group so that the contact list only displays the Contacts that are members of such group. With this design, locating a particular Contact or group of Contacts from the User's contact list can be expedited.

The User can elect to change the clearance level 956 for one or more of the Contacts on the User's contact list. In one embodiment, based on the Contact selected by the User from the contact list, the database 17 is queried to retrieve the appropriate clearance level 956. In this example, the User can be presented with the clearance level 956 for the Contact, and can then use the drop-down menu 957 to select a new clearance level 956. When the User selects a new clearance level 956 for the Contact, the database 17 is queried to update the clearance level 956 for that Contact. The next time the Contact accesses the data for the User, the extent of the Contact's access of the User's data will be determined by the new clearance level 956 set by the User for that Contact.

Further, in this embodiment, the User can elect to include or exclude the particular Contact from the User's mobile list. The User can utilize the mobile list setting 958 for each Contact on the User's contact list. By selecting "Include", the User is choosing to include the Contact and some or all of the Contact's data from the database 17 (illustrated in FIG. 1) when the User accesses the database 17 from the User's wireless device such as a mobile phone 14D (illustrated in FIG. 1), as explained in greater detail below. In contrast, the User can elect to "Exclude" the Contact from the User's mobile list using the mobile list setting 958. With this design, the User can expedite usage of the User's mobile phone 14D by filtering out various Contacts that the User does not want to access while using the User's mobile phone 14D or other wireless device.

FIG. 9B is an embodiment of a mobile phone 14D illustrating a mobile phone filter screen 958A. In this embodiment, the screen 958A indicates whether the mobile phone filter is "on" 960 or "off" 962. In one embodiment, when the mobile phone filter is on, only the data from those Contacts whom the User has specified to "Include" on the User's mobile list can be accessed from the User's mobile phone. Further, when the mobile phone filter is off, the User can access some or all of the data from each Contact, regardless of whether the Contact has been included or excluded from the User's mobile list.

Referring again to FIG. 2, in one embodiment, the User can print 260 any information from the database 17 to which the User has access. For example, the User can elect to print 260 part or all of the data fields input into the database 17 from one Contact. Alternatively, the User can print 260 certain data fields from some or all of the Contacts on the User's Contact list, e.g. all mobile phone numbers and home addresses for each Contact on the User's contact list as a non-exclusive example. In one embodiment, the User can select specific data fields from particular Contacts, and can quickly and efficiently consolidate and print 260 this up-to-date information on a single page without having to pick and choose the data from the display of each Contact. With this design, less time is spent searching, selecting, and manually compiling the desired information.

Moreover, in one embodiment of the database 17, the User can access a directory 262 of some or all of the names of the individuals or entities that have registered with the system 10. From this directory 262, the User can select one or more desired Contacts to add to the User's contact list 232. For example, in one embodiment, the name of each individual or entity can be hyperlinked to allow the User to more expeditiously and efficiently request an authorization from such individual or entity. In the embodiments that require reciprocity before data can be exchanged, the desired Contact must authorize the User to access the data of the desired Contact before the User has access to any data from the desired Contact.

Further, in one embodiment, when the User attempts to add an individual or entity from the directory 262, the User has thereby authorized the Contact to access the User's data from the database 17, and the Contact can immediately access such data by logging in to the database 17. In an alternative embodiment, the Contact must first authorize the User before the Contact can access the User's data from the database 17.

Each User can have the option of removing or adding that User's name from the directory 262. Alternatively, each User can have the option of including such User's name in the directory 262 without including such User's name including a hyperlink, thereby disabling any requests for authorization of such User by other Users via the directory 262.

Figure 10A:
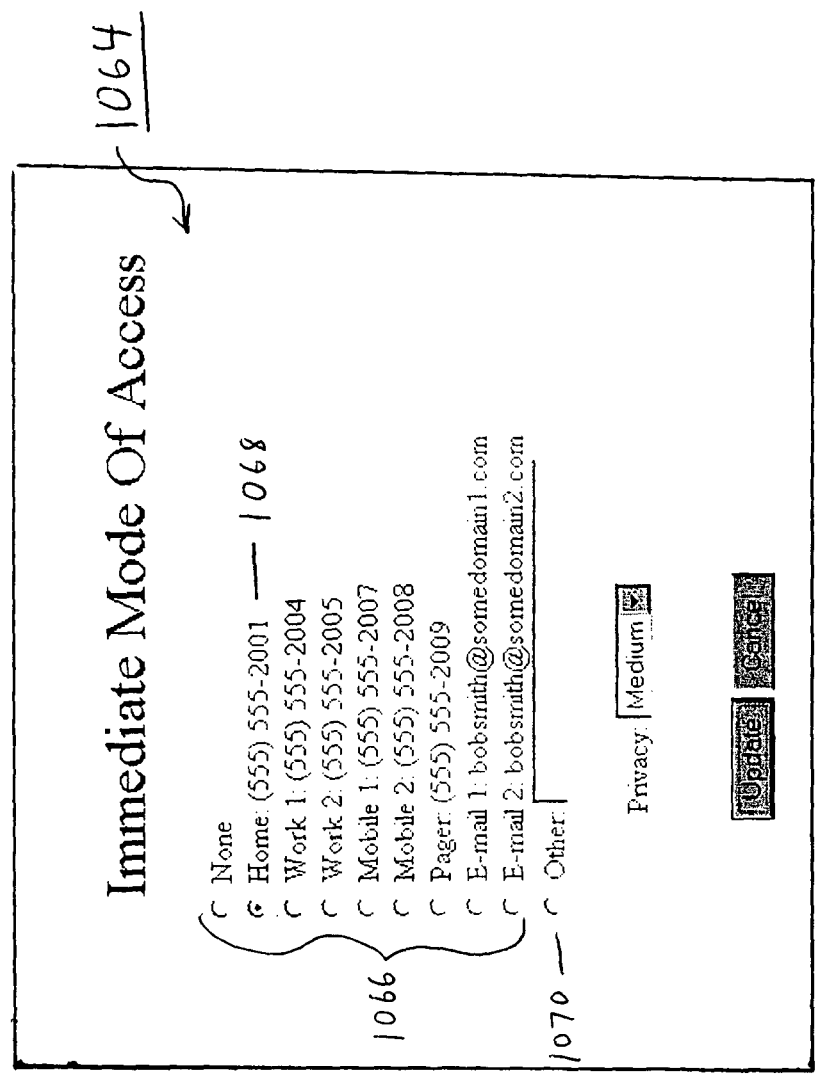
FIG. 10A is an embodiment of an immediate mode of access screen having features of the present invention.

FIG. 10A illustrates an embodiment of an immediate mode of access screen 1064 that the User can reach once the User selects the immediate mode of access function 264 from the contact list screen 432 (illustrated in FIG. 4A). In this embodiment, the database 17 (illustrated in FIG. 1) provides the User with a plurality of potential mode of access selections 1066 that are taken directly from the User's data input into the database 17. From the list of various potential modes of access 1066, the User can select one mode of access to be the User's immediate mode of access 1068. Stated another way, the immediate mode of access 1068 is provided to one or more of the User's Contacts, and represents the desired manner of reaching the User at that moment from the perspective of the User. In the embodiment illustrated in FIG. 10A, the User has selected a home phone number, (555) 555-2001, as the User's immediate mode of access 1068. In an alternative embodiment, the immediate mode of access 1068 can be selected from a drop-down menu, or the immediate mode of access 1068 can be manually input into a blank data field 1070 as illustrated in FIG. 10A. Still alternatively, a default immediate mode of access 1068 can be one specific data field such as the User's first mobile phone number, for example.

The immediate mode of access 1068 of the User can be automatically communicated to each Contact on the User's contact list 232 (illustrated in FIG. 4A) that has authorized access to such information. Once the User changes his immediate mode of access 1068, an authorized Contact who is logged in or subsequently logs in to the system 10 and retrieves the User's data will be provided with the updated immediate mode of access 1068 of the User. With this design, the guesswork normally required by a User in attempting to determine how to reach one of the User's Contacts is reduced or eliminated entirely.

Figure 10B:
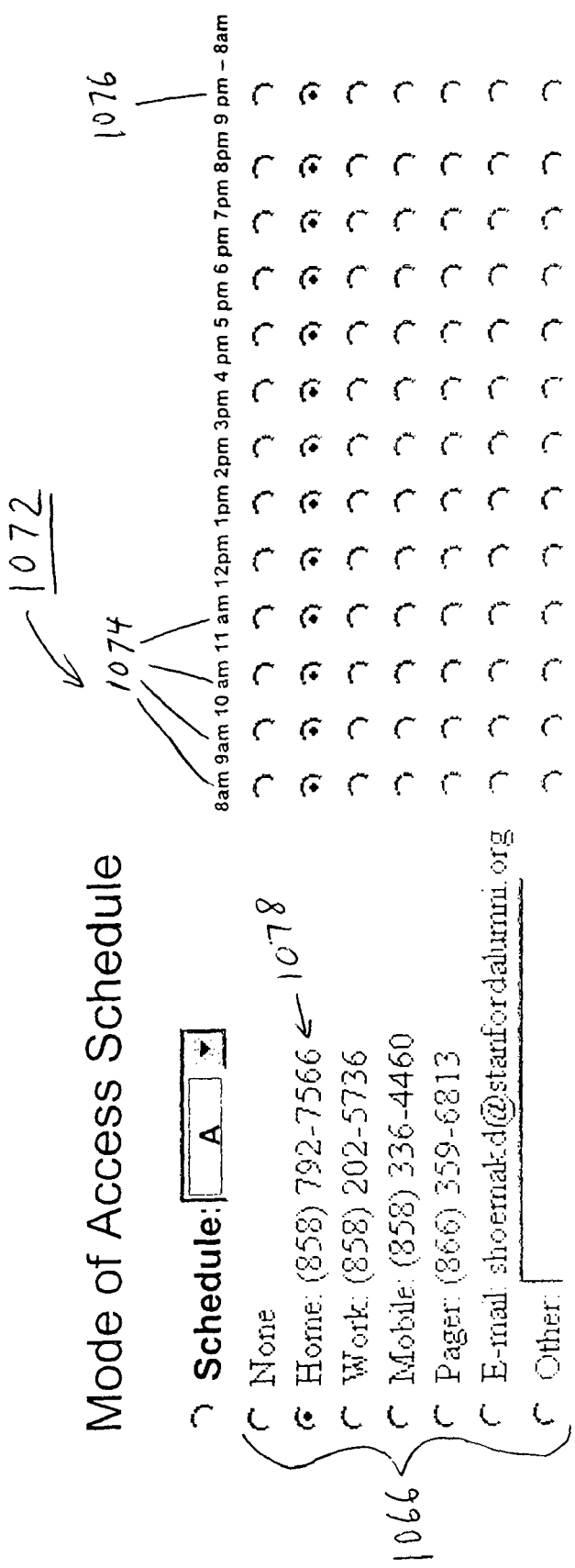
FIG. 10B is an embodiment of an immediate mode of access schedule screen having features of the present invention.

FIG. 10B is an embodiment of a mode of access schedule screen 1072 that the User can utilize. The design of the mode of access schedule screen 1072 can vary depending upon the specific needs of the User and to suit the design requirements of the system 10 and the database 17 (illustrated in FIG. 1). In this embodiment, the database 17 can compile previously-input data by the User or newly input data by the User, and can provide a selection of various potential modes of access 1066 for the User. The User can then preset the User's anticipated immediate and future modes of access for various time periods. For example, in the embodiment illustrated in FIG. 10B, the schedule includes a plurality of one-hour time periods 1074 and an eleven-hour time period 1076 over a one-day time frame. However, it is recognized that the mode of access schedule can utilize any desired time periods over any extended time frame, as input by the User and/or specified by the database 17. For example, the time periods can be ten-minutes each, and the time frame can be one hour. Alternatively, the time periods can be 12-hours each, and the time frame can be one week. The foregoing examples are merely representative of the numerous possible time periods and time frames that can be utilized with the present invention.

As illustrated in FIG. 10B, the User can select one immediate mode of access 1068, e.g. a home phone number 1078, which can remain in effect for the entire time frame, e.g. one day. In this embodiment, the User chooses to be accessible at the same phone number for the entire day.

FIG. 10C is another mode of access schedule screen 1072 wherein the selections made by the User have been modified from the previous schedule illustrated in FIG. 10B. In this example, the User has generated and selected a Schedule A (1080), which can represent one or more particular days of the week, i.e. Mondays and Fridays, or it can represent a one-of-a-kind day that the User anticipates having. For example, the User expects to be accessible by the User's home phone number from approximately 8 a.m. to 9 a.m. Between 9 a.m. and 10 a.m., the User expects to be accessible on the User's mobile phone. Between 10 a.m. and 12 p.m., the User expects to be accessible by the User's work phone number, and so forth throughout the day. With this design, the User can preset the User's mode of access schedule for convenience, or in the event the User may not have access to the database 17 (illustrated in FIG. 1) at various times during the day, week, month, etc. In this embodiment, the immediate mode of access 1068 that can be accessed by one or more of the User's Contacts will be automatically updated throughout the day, and will allow authorized Contacts on the User's contact list to access only the current information, e.g. the immediate mode of access 1068 of the User.

Schedule A can be saved to the database 17, and can be retrieved by the User and reused by the User as appropriate. In this embodiment, the mode of access schedule and/or the future modes of access cannot be accessed by any of the User's Contacts. Instead, any of the User's Contacts with access to the User's immediate mode of access 1068 can access only the immediate mode of access 1068 from the active time period, i.e. the time period that represents the current time of day. In one embodiment, the Contact does not have access to the time period so that the Contact does not know how long the current immediate mode of access 1068 will remain in effect before changing to another immediate mode of access 1068. Stated another way, the User's mode of access schedule is transparent to the User's Contacts. Alternatively, the User can provide Contacts access to the User's schedule in accordance with the clearance levels and privacy levels provided herein.

Figure 10D:
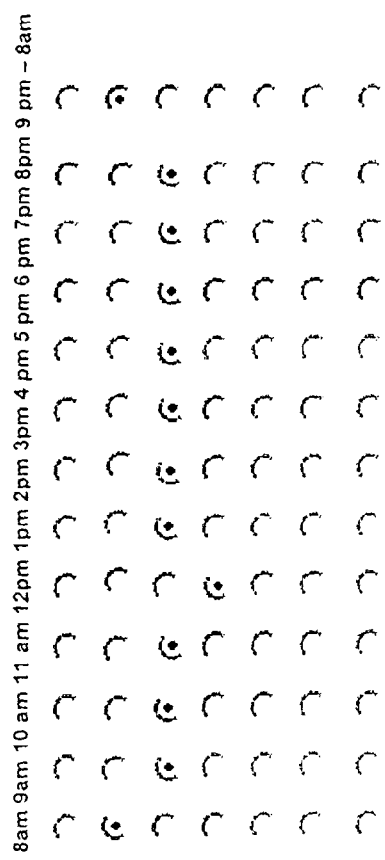
FIG. 10D is another embodiment of the immediate mode of access schedule screen having features of the present invention.

FIG. 10D is another mode of access schedule screen 1072 wherein the selections made by the User have been modified from the previous schedule illustrated in FIG. 10C. In this example, the User has generated and selected a Schedule B (1082), which can represent one or more particular days of the week, i.e. Tuesdays through Thursdays, or it can represent a unique day that the User anticipates having. Schedule B can likewise be saved to the database 17 (illustrated in FIG. 1), and can be retrieved by the User and reused by the User as appropriate.

In an alternative embodiment, a schedule somewhat similar to the mode of access schedule can be used for any other data field input by the User. For example, the schedule can track other information from the User that has a tendency to change over time, such as the User's physical location, as one non-exclusive example. The foregoing mode of access schedule is representative of the type of information that can be included in a schedule as provided herein, and is not intended to be limiting in any way.

Figure 11:
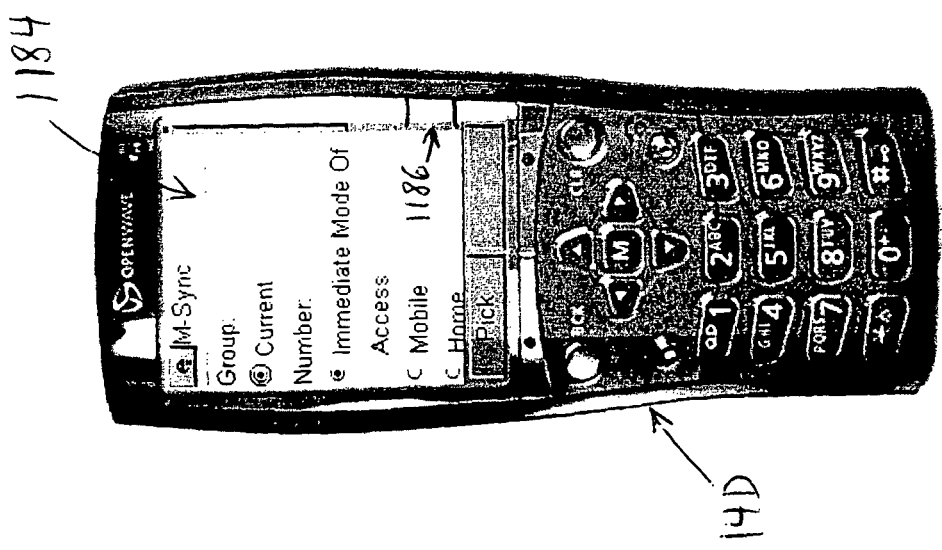
FIG. 11 is an embodiment of a synchronization screen having features of the present invention.

FIG. 11 is an embodiment of a synchronization screen 1184 generated by the database 17 (illustrated in FIG. 1) that is accessible with a wireless device such as a mobile phone 14D. In this embodiment, a User can synchronize the data from the User's Contacts with a memory 1186 of the wireless device. For example, the memory 1186 can include one or more storage devices that store names, addresses, phone numbers, etc. The memory 1186 can be in the form of an integrated circuit such as random access memory (RAM), a single in-line memory module (SIMM), a storage disk, a storage tape, a processor, or any other suitable device that can store data.

In this embodiment, the data that is maintained in the database 17 for one or more of the User's Contacts can manually or automatically be synchronized with the memory 1186 of the mobile phone 14D or other wireless device. With this design, the User can update the memory 1186 of the wireless device with the up-to-date data from the database 17, thereby increasing the likelihood of maintaining more current, accurate data within the memory 1186 of the wireless device. By synchronizing the dynamic information stored and continually updated in the database 17 with the memory 1186 of the wireless device, the User can increase the probability of having access to current data from the User's wireless device, even when the User cannot access the database directly from the Internet. For example, it is well known that in certain geographical locations it is difficult or impossible to obtain Internet access. The present invention allows the User to rely on the memory 1186 of the User's wireless device which has been synchronized with the data from the database 17, without the User having to manually update the memory 1186 for each of the User's Contacts.

The synchronization of data between the database 17 and the memory 1186 of the wireless device can be customized by the User. In one embodiment, the User can synchronize specific data fields from the database 17 to the memory 1186 of the wireless device. For example, the User can choose to synchronize only the immediate mode of access for one or more Contacts with the memory 1186 of the wireless device. Provided this type of synchronization occurs on a routine basis, the User can be relatively certain of having access to the immediate mode of access of each Contact, without connecting to the system 10 via the Internet. Alternatively, the User can synchronize other data fields, such as all mobile phone numbers or electronic mail addresses of the User's Contacts, as non-exclusive examples.

In one embodiment, the User can manually determine when to synchronize data from the database 17 with the memory 1186 of the wireless device. In an alternative embodiment, the User can determine the frequency that the database 17 will automatically perform this synchronization process. For instance, with various wireless devices having the appropriate application technology, the User can specify that the database 17 will interface with the wireless device over the Internet and synchronize the specified data at any regular time intervals, such as at least approximately one time per week, one time per day, one time per hour, one time per minute, one time per second, continuously, or anytime a modification is made to a relevant data field for one of the User's Contacts, as non-exclusive examples. Still alternatively, the database 17 can interface with the wireless device over the Internet and synchronize relevant data from the database 17 when the User first connects to the Internet, or logs in to the website 210 (illustrated in FIG. 2) of the present invention.

Figure 12:
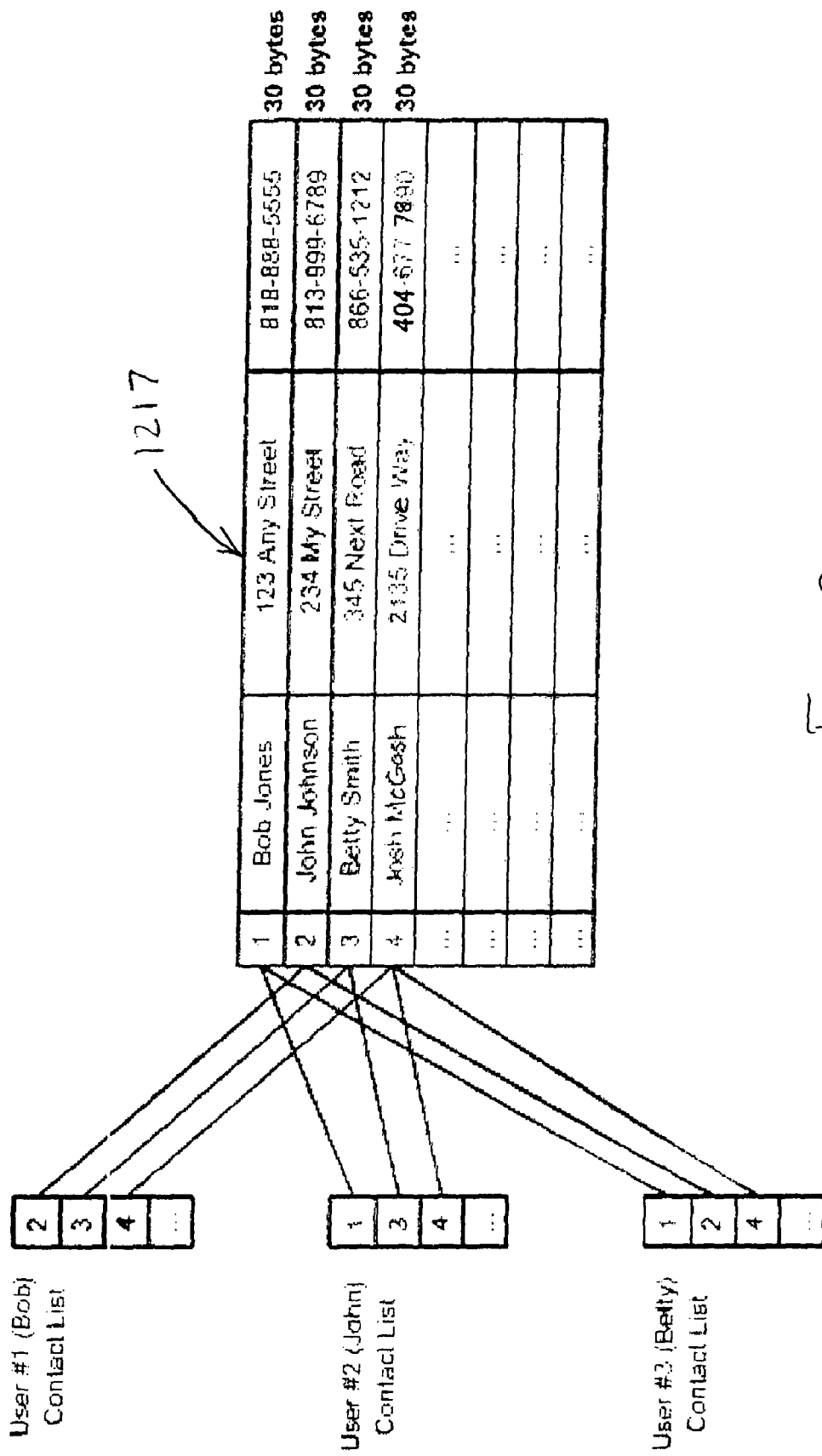
FIG. 12 is a diagram illustrating the storage of data in the database of the computer system.

FIG. 12 is a diagram illustrating one embodiment of how data is stored in the database 1217. As described herein, multiple Users can have the same Contact in each of the Users' contact list. However, in this embodiment, only one data record is maintained in the database 1217 for such Contact. Thus, in FIG. 12, User #1, User #2 and User #3 each have added Josh McGosh to their respective contact lists. The database 1217 has stored only one Josh McGosh, under a unique database identifier number "4". Therefore, when one or more of the Users want to access data input into the database 1217 by Josh McGosh, the database is queried, the appropriate determination of authorization (and reciprocity, if required) can be performed as provided herein, a comparison of the clearance levels for the Users and privacy levels for the data input by Josh McGosh can be performed as provided herein, and the data made available to the Users from a single location within the database 1217.

Stated another way, storage of a single set of data for each User in the database 1217 decreases the likelihood of inaccuracies of the data, and conserves space within the database 1217 by avoiding duplicative entries and/or data fields. In the example provided in FIG. 12, the data for each User or Contact takes up a reduced amount of space in the database, regardless of the number of other Users who have listed such User or Contact in their respective contact lists. Additionally, because the data of all of a User's Contacts is not stored on the User's device, little or no storage space is required by the User during usage of the present invention.

The present invention is particularly suited to a User having a plurality of Contacts in the User's contact list. With the design provided herein, because each Contact is responsible for updating only that Contact's own information, time spent by the User updating the User's Contact information can be substantially reduced or eliminated. For Users having a substantial number of Contacts in their contact list, this time reduction can be significant.

Moreover, in various embodiments, the present invention does not depend on synchronization of data between devices in order to keep data consistent. Personal, business or any other type of information for each User of the system is stored in the database 1217 and can be securely retrieved from any device as provided herein. Thus, Users do not need to constantly, or even occasionally synchronize data between two of the User's devices in order to maintain a high level of confidence that the data will be the same on each device.

Further, in alternative embodiments that utilize mobile devices that cannot connect internet access, the User can send information via Infrared (IR), Universal Serial Bus (USB), Firewire (IEEE), Short Message Service (SMS), Multimedia Message Service (MMS), or Enhanced Message Service (EMS), as non-exclusive examples, to the mobile device of the User. Mobile devices can also be synchronized to a personal computer using messaging technology such as or any other suitable messaging technology. With this design, blocks of Contact Information are sent in a SMS or MMS message from the Contact Information Service website to a phone number of the wireless device.

The present invention can be used in applications too numerous to list herein. In one embodiment, the present invention can be used to maintain a real time, updated address book that includes useful information that may be difficult or impossible to obtain by means other than keeping a physical address book that must be constantly updated by hand, assuming the information is readily available. Other examples of applications for the present invention include using the database 17 in the service industry to track the status of automobile repair work, in the insurance industry to track information from the insureds, in the financial industry to track investments and investor information as well as the stock market, in the real estate business to track information from potential buyers and sellers, and in the sales business to track information from customers and potential customers, as non-exclusive examples. Further, medical research, including medical conditions of patients can be monitored over a time following medical procedures in order to provide the medical community with a greater pool of data from which to draw for fostering advances in medicine. Moreover, tracking medical patients in need of medical services, e.g. transplant donors or potential recipients, can be easily and efficiently performed using the present invention.

Because all of the data input by the Users of the system 10 can be maintained on the database 17, and because no downloading of software or other applications is necessary, if the User's electronic device is ever lost, stolen, broken or destroyed, or if the data on the device becomes lost or unusable, i.e. in the case of a hard drive crash or other system malfunction, the user does not need to completely reprogram the device and re-enter all of the data onto the device. Further the present invention obviates the need to obtain the lost data from a backup system, which may also be not entirely up-to-date. Such an unpleasant experience can be extremely frustrating and can require a significant amount of time which most people cannot afford to spend.

Thus, the system provided herein can allow each User to keep track of the User's Contacts, without requiring any maintenance to do so. Further, the present invention can increase the likelihood that business and/or personal contact information, or any other dynamic data is up-to-the-second accurate with a substantially reduced level of time and effort required by the User. Moreover, the system and method provided herein can increase the success rate of accessing a Contact by the mode desired by that Contact. In addition, the system and method can be used from nearly any Internet-accessible computer, which are basically ubiquitous around the world.

While the particular system 10 and method for exchange of data as herein shown and disclosed in detail are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A system for transmission of data between a first device operated by a first user and a second device operated by a second user, the system comprising:
   a database that is in network communication with the first device and the second device, the database receiving a first set of data input by the first user from the first device, the first set of data including a future mode of access of the first user, the future mode of access correlating to a time period during which the future mode of access will become an immediate mode of access of the first user, the immediate mode of access of the first user being accessible from the database by the second user using the second device, wherein the database receives a second set of data input by the second user, and wherein the second user has access to the immediate mode of access from the database only after the second user authorizes the database to allow the first user access to at least a portion of the second set of data from the database.

2. The system of claim 1 wherein the future mode of access of the first user is inaccessible to the second user.

3. The system of claim 1 wherein the time period is inaccessible to the second user.

4. The system of claim 1 wherein the first user changes the immediate mode of access of the first user in the database using an auditory recognition device.

5. The system of claim 1 wherein the first set of data includes a plurality of future modes of access of the first user, each future mode of access correlating to one or more corresponding time periods during which each such future mode of access will become an immediate mode of access of the first user.

6. The system of claim 5 wherein at least one of the time periods is at least approximately one hour in length.

7. The system of claim 1 wherein the future mode of access is selected from at least one of a phone number, an electronic mail address, a facsimile number and a text message number.

8. The system of claim 1 wherein the second device is a wireless device having a memory.

9. The system of claim 8 wherein the database automatically updates the memory of the wireless device with the immediate mode of access of the first user at least approximately one time per day.

10. The system of claim 1 wherein the second device is a mobile phone having a storage device, and wherein the database automatically updates the storage device of the mobile phone with the immediate mode of access of the first user at a frequency that is input into the database by the second user.

11. The system of claim 1 wherein the database is part of a non-distributed network.

12. The system of claim 1 wherein the first user has access to at least a portion of the second set of data only after the first user has authorized the database to allow the second user access to at least a portion of the first set of data from the database.

13. The system of claim 1 wherein the database receives a privacy level that is input by the first user for the immediate mode of access of the first user, the privacy level being selected from a hierarchy of privacy levels, and wherein the database receives a clearance level for the second user that is input by the first user, the clearance level being selected from a hierarchy of clearance levels that correspond with the hierarchy of privacy levels, the clearance level being measured against the privacy level to determine whether the second user has access to the immediate mode of access of the first user from the database.

14. The system of claim 13 wherein the clearance level must be at least as high in the hierarchy of clearance levels as the privacy level is high in the hierarchy of privacy levels for the second user to have access to the immediate mode of access of the first user from the database.

15. The system of claim 1 wherein the second device includes an auditory recognition device, the second device communicating with the database using the auditory recognition device.

16. A system for selective transmission of data between a first device operated by a first user, a second device and a third device, the system comprising:
a database that is in network communication with the first device and the second device, the database receiving a future mode of access of the first user that is input into the database using the first device, the future mode of access of the first user not being accessible from the second device, the database receiving a second set of data input by the second user, wherein the second user has access to the immediate mode of access from the database only after the second user authorizes the database to allow the first user access to at least a portion of the second set of data from the database;
wherein at a predetermined time, the future mode of access of the first user automatically changes within the database to become an immediate mode of access of the first user, the database providing access by the second device to the immediate mode of access of the first user and denying access by the third device to the immediate mode of access of the first user.

17. The system of claim 16 wherein the database receives a plurality of future modes of access of the first user from the first device, each future mode of access correlating to a separate time period during which the future mode of access will automatically become the immediate mode of access of the first user.

18. The system of claim 16 wherein the predetermined time is determined by the first user.

19. The system of claim 16 wherein the future mode of access is selected from the group consisting of a phone number, an electronic mail address, a text message request and a facsimile number.

20. The system of claim 16 wherein the predetermined time is inaccessible from the second device.

21. The system of claim 16 wherein the database is adapted to change the immediate mode of access of the first user based on a command from the first user using an auditory recognition device.

22. The system of claim 16 wherein the second device is a wireless device having a memory.

23. The system of claim 22 wherein the database automatically updates the memory of the wireless device with the immediate mode of access of the first user at least approximately one time per day.

24. The system of claim 16 wherein the second device is a mobile phone having a storage device, and wherein the database automatically updates the storage device of the mobile phone with the immediate mode of access of the first user at a frequency that is input into the database by a second user.

25. The system of claim 16 wherein the database is part of a non-distributed network.

26. The system of claim 16 wherein the first user has access to at least a portion of the second set of data only after the first user has authorized the database to allow the second user access to at least a portion of the first set of data from the database.

27. A system for transmission of data between a first device operated by a first user and a second device, the system comprising:
a database that is in network communication with the first device and the second device, the database receiving a mode of access schedule of the first user from the first device, the mode of access schedule including data that includes an immediate mode of access of the first user and a future mode of access of the first user, the database receiving a second set of data input by the second user, wherein the second user has access to the immediate mode of access from the database only after the second user authorizes the database to allow the first user access to at least a portion of the second set of data from the database, the database allowing access by the second device to only a portion of the data;
wherein at a predetermined time, (i) the future mode of access of the first user automatically changes within the database to an immediate mode of access of the first user, and (ii) the database selectively changes the portion of the data that is accessible from the second device.

28. The system of claim 27 wherein the portion of data that is accessible by the second device includes the immediate mode of access of the first user.

29. The system of claim 27 wherein the portion of data that is accessible by the second device does not include the future mode of access of the first user.

30. The system of claim 29 wherein the portion of data that is accessible by the second device includes the immediate mode of access of the first user.

31. The system of claim 27 wherein the database receives a plurality of future modes of access of the first user from the first device, each future mode of access correlating to a future time period during which the future mode of access will automatically become the immediate mode of access of the first user.

32. The system of claim 27 wherein the predetermined time is determined by the first user.

33. The system of claim 27 wherein the future mode of access is selected from the group consisting of a phone number, an electronic mail address, a text message request and a facsimile number.

34. The system of claim 27 wherein the predetermined time is inaccessible from the second device.

35. The system of claim 27 wherein the database is adapted to change the immediate mode of access of the first user based on a command from the first user using an auditory recognition device.

36. The system of claim 27 wherein the second device is a wireless device having a memory.

37. The system of claim 36 wherein the database automatically updates the memory of the wireless device with the immediate mode of access of the first user at least approximately one time per day.

38. The system of claim 27 wherein the second device is a mobile phone having a storage device, and wherein the database automatically updates the storage device of the mobile phone with the immediate mode of access of the first user at a frequency that is input into the database by a second user.

39. The system of claim 27 wherein the database is part of a non-distributed network.

40. The system of claim 27 wherein the first user has access to at least a portion of the second set of data only after the first user has authorized the database to allow the second user access to at least a portion of the first set of data from the database.

41. The system of claim 27 wherein the database is adapted to deny access by a third user to the immediate mode of access of the first user.

42. A system for transmission of data between a first device operated by a first user and a second device operated by a second user, the system comprising:
a database that is in network communication with the first device and the second device, the database receiving a future mode of access of the first user that is input using the first device, the future mode of access of the first user not being accessible from the second device, the database receiving a second set of data input by the second user, wherein the second user has access to the immediate mode of access from the database only after the second user authorizes the database to allow the first user access to at least a portion of the second set of data from the database;
wherein at a predetermined time, the future mode of access of the first user automatically changes within the database to become an immediate mode of access of the first user, the database providing access by the second device to the immediate mode of access of the first user.

43. The system of claim 42 wherein the database receives a plurality of future modes of access of the first user from the first device, each future mode of access correlating to a future time period during which the future mode of access will automatically become the immediate mode of access of the first user.

44. The system of claim 42 wherein the predetermined time is determined by the first user.

45. The system of claim 42 wherein the future mode of access is selected from the group consisting of a phone number, an electronic mail address, a text message request and a facsimile number.

46. The system of claim 42 wherein the predetermined time is inaccessible from the second device.

47. The system of claim 42 wherein the database is adapted to change the immediate mode of access of the first user based on a command from the first user using an auditory recognition device.

48. The system of claim 42 wherein the second device is a wireless device having a memory.

49. The system of claim 48 wherein the database automatically updates the memory of the wireless device with the immediate mode of access of the first user at least approximately one time per day.

50. The system of claim 42 wherein the second device is a mobile phone having a storage device, and wherein the database automatically updates the storage device of the mobile phone with the immediate mode of access of the first user at a frequency that is input into the database by a second user.

51. The system of claim 42 wherein the database is part of a non-distributed network.

52. The system of claim 42 wherein the first user has access to at least a portion of the second set of data only after the first user has authorized the database to allow the second user access to at least a portion of the first set of data from the database.

53. The system of claim 42 wherein the database is adapted to deny access by a third user to the immediate mode of access of the first user.

54. The system of claim 42 wherein the first device includes a mobile phone.

55. A system for transmission of data between a first device operated by a first user and a second device operated by a second user, the system comprising:
a database that is in network communication with the first device and the second device, the database being adapted to receive from the first device data that includes an immediate mode of access of the first user and a future mode of access of the first user, the database being adapted to receive a second set of data input by the second user, wherein the second user has access to the immediate mode of access from the database only after the second user authorizes the database to allow the first user access to at least a portion of the second set of data from the database, the database allowing access by the second device to the immediate mode of access of the first user and not to the future mode of access of the first user;
wherein at a predetermined time, (i) the future mode of access data of the first user automatically changes within the database to become the immediate mode of access data of the first user.

56. The system of claim 55 wherein the database receives a plurality of future modes of access of the first user from the first device, each future mode of access correlating to a future time period during which the future mode of access will automatically become the immediate mode of access of the first user.

57. The system of claim 55 wherein the predetermined time is determined by the first user.

58. The system of claim 55 wherein the future mode of access is selected from the group consisting of a phone number, an electronic mail address, a text message request and a facsimile number.

59. The system of claim 55 wherein the predetermined time is inaccessible from the second device.

60. The system of claim 55 wherein the database is adapted to change the immediate mode of access of the first user based on a command from the first user using an auditory recognition device.

61. The system of claim 55 wherein the second device is a wireless device having a memory.

62. The system of claim 61 wherein the database automatically updates the memory of the wireless device with the immediate mode of access of the first user at least approximately one time per day.

63. The system of claim 55 wherein the second device is a mobile phone having a storage device, and wherein the database automatically updates the storage device of the mobile phone with the immediate mode of access of the first user at a frequency that is input into the database by a second user.

64. The system of claim 55 wherein the database is part of a non-distributed network.

65. The system of claim 55 wherein the first user has access to at least a portion of the second set of data only after the first user has authorized the database to allow the second user access to at least a portion of the first set of data from the database.

66. The system of claim 55 wherein the database is adapted to deny access by a third user to the immediate mode of access of the first user.

67. The system of claim 55 wherein the first device includes a mobile phone.

* * * * *